(12) United States Patent
Tatemura

(10) Patent No.: US 10,073,202 B2
(45) Date of Patent: Sep. 11, 2018

(54) NEAR-INFRARED CUT FILTER

(71) Applicant: ASAHI GLASS COMPANY, LIMITED, Tokyo (JP)

(72) Inventor: Mitsuyuki Tatemura, Shizuoka-ken (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/621,899

(22) Filed: Feb. 13, 2015

(65) Prior Publication Data

US 2015/0160386 A1   Jun. 11, 2015

Related U.S. Application Data

(63) Continuation of application No. PCT/JP2013/071219, filed on Aug. 6, 2013.

(30) Foreign Application Priority Data

Aug. 29, 2012  (JP) ................. 2012-188228

(51) Int. Cl.
  *G02B 5/28* (2006.01)
  *G02B 5/20* (2006.01)
(52) U.S. Cl.
  CPC ............. *G02B 5/282* (2013.01); *G02B 5/208* (2013.01); *G02B 5/283* (2013.01)
(58) Field of Classification Search
  CPC ................. G02B 5/208; G02B 5/282

(Continued)

(56) References Cited

U.S. PATENT DOCUMENTS

| 5,249,012 A * | 9/1993 | Taniguchi | ............... G02B 7/36 |
| | | | 396/81 |
| 2005/0018302 A1* | 1/2005 | Yano | ...................... G02B 5/281 |
| | | | 359/588 |

(Continued)

FOREIGN PATENT DOCUMENTS

| CN | 1979230 A | 6/2007 |
| CN | 101105547 | 1/2008 |

(Continued)

OTHER PUBLICATIONS

U.S. Appl. No. 14/728,115, filed Jun. 2, 2015, Tatemura.

(Continued)

*Primary Examiner* — Zachary Wilkes
*Assistant Examiner* — Mitchell Oestreich
(74) *Attorney, Agent, or Firm* — Oblon, McClelland, Maier & Neustadt, L.L.P.

(57) ABSTRACT

A near-infrared cut filter has an optical multilayer provided on at least one main surface of a transparent substrate, in which the optical multilayer is formed of a high-refractive index layer having a refractive index of 2.0 or more, and a low-refractive index layer having a refractive index of 1.6 or less at a wavelength of 500 nm, and the optical multilayer has a repeating structure of $(a_n Q_H, b_n Q_L, c_n Q_H, d_n Q_L)^\frown n$ when a QWOT at the wavelength of 500 nm of the high-refractive index layer is set to $Q_H$, and a QWOT at the wavelength of 500 nm of the low-refractive index layer is set to $Q_L$, in which an average value of the $a_n$ is not less than 1.5 nor more than 2.5, and a value obtained by averaging average values of the respective $b_n$, $c_n$, and $d_n$ is 1.0 or less.

6 Claims, 11 Drawing Sheets

(58) Field of Classification Search
USPC .......................................................... 359/359
See application file for complete search history.

(56) References Cited

U.S. PATENT DOCUMENTS

| | | | |
|---|---|---|---|
| 2007/0127126 A1 | 6/2007 | Terada | |
| 2008/0013178 A1 | 1/2008 | Terada | |
| 2010/0188737 A1 | 7/2010 | Terada | |
| 2012/0145901 A1 | 6/2012 | Kakiuchi et al. | |
| 2013/0094075 A1 | 4/2013 | Saitoh et al. | |
| 2014/0139912 A1* | 5/2014 | Osawa ................... | G02B 5/282 |
| | | | 359/359 |

FOREIGN PATENT DOCUMENTS

| | | |
|---|---|---|
| CN | 102985856 A | 3/2013 |
| CN | 102575340 B | 4/2014 |
| CN | 103827705 A | 5/2014 |
| EP | 1879058 | 1/2008 |
| JP | 7-027907 | 1/1995 |
| JP | 11-202127 | 7/1999 |
| JP | 2007-183525 | 7/2007 |
| JP | 2008-020563 | 1/2008 |
| JP | 2011-127213 | 6/2011 |
| JP | 5013022 B | 6/2012 |
| JP | 2012-137728 | 7/2012 |
| JP | WO 2013015303 A1 * 1/2013 ............. G02B 5/282 |  |
| JP | 2013-178338 | 9/2013 |
| KR | 10-2013-0018803 | 2/2013 |
| TW | 201142340 A1 | 12/2011 |
| TW | 201224533 A1 | 6/2012 |
| TW | 201319632 A1 | 5/2013 |
| WO | WO 2011/077892 A1 | 6/2011 |
| WO | WO 2011/158635 A1 | 12/2011 |
| WO | WO 2013/042738 A1 | 3/2013 |

OTHER PUBLICATIONS

International Search Report issued in International Application No. PCT/JP2013/071219, dated Oct. 8, 2013.
International Preliminary Report on Patentability and Written Opinion dated Mar. 12, 2015 in PCT/JP2013/071219.

* cited by examiner

NEAR-INFRARED CUT FILTER

CROSS-REFERENCE TO RELATED APPLICATIONS

This application is a continuation of prior International Application No. PCT/JP2013071219 filed on Aug. 6, 2013, which is based upon and claims the benefit of priority from Japanese Patent Application No. 2012-188228 filed on Aug. 29, 2012; the entire contents of all of which are incorporated herein by reference.

TECHNICAL FIELD

The present invention relates to a near-infrared cut filter, and particularly relates to a near-infrared cut filter having an optical multilayer formed on a transparent substrate.

BACKGROUND

For a digital camera, a digital video and the like, a CCD (Charge Coupled Device) image sensor, a CMOS (Complementary Metal Oxide Semiconductor) image sensor and the like (hereinafter, referred to as solid-state imaging devices) are used. However, spectral characteristics of the solid-state imaging devices have high sensitivities with respect to infrared light as compared to human visibility characteristics. Accordingly, spectral correction with the use of a near-infrared cut filter is performed in the digital camera, the digital video and the like.

As the near-infrared cut filter, for example, a near-infrared absorption type color glass filter such as fluorophosphate-based glass containing $Cu^{2+}$ ions as a coloring component has been used. However, since the light in a near-infrared region and an ultraviolet region cannot be sufficiently cut by the color glass filter itself, an optical multilayer having characteristics capable of cutting near-infrared light is used in combination at present.

When the optical multilayer is used in combination, a half-value wavelength on an ultraviolet side of a transmission band through which visible light is transmitted, is determined by characteristics of the optical multilayer, and a half-value wavelength on an infrared side of the transmission band is determined by characteristics of the color glass filter. This is because, since there is a tendency that a spectral waveform of the optical multilayer is shifted to the ultraviolet region side in accordance with an increase in an incident angle of light, and a spectral waveform of the color glass filter is difficult to be shifted to the ultraviolet region side when the incident angle of light is increased, it is reasonable to cut, with the use of the optical multilayer, the light in the wavelength region which cannot be cut by the color glass filter, while utilizing the spectral waveform of the color glass filter as much as possible.

Incidentally, the digital camera, the digital video and the like have been reduced in size and thickness in recent years. For this reason, a lens of the digital camera, the digital video and the like is increasingly made to have a wider angle. In accordance with this, an incident angle dependence of the wavelength region cut by the optical multilayer becomes a problem. Concretely, in a transmission band of 400 to 700 nm required by a solid-state imaging device, a rising position of a transmittance with respect to the transmission band from a stop band on the ultraviolet side and a rising position of a transmittance with respect to the transmission band from a stop band on the near-infrared side formed by the optical multilayer are displaced depending on an incident angle of light, which changes an amount of light in a band (transmission band) which exerts an influence on an image quality.

As described above, it has been conventionally known that the optical multilayer has the incident angle dependence such that the spectral waveform is shifted to the ultraviolet side when the incident angle of light is increased. The incident angle dependence has been a big problem in a field of dichroic mirror and the like used for a prism and the like, so that techniques for suppressing the incident angle dependence of the optical multilayer have been proposed.

PRIOR ART DOCUMENT

Patent Document

Patent Document 1: Japanese Patent Application Laid-open No. Hei 7-027907
Patent Document 2: Japanese Patent Application Laid-open No. Hei 11-202127
Patent Document 3: Japanese Patent Application Laid-open No. 2008-020563

SUMMARY

In Patent Documents 1 to 3, it is proposed to utilize the fact that an incident angle dependence of spectrum becomes small in a layer with higher refractive index. Concretely, Patent Document 1 proposes that a $SiO_2$ layer which increases the incident angle dependence due to its low refractive index is eliminated, and an optical multilayer is formed by utilizing a small difference of refractive index between mutual high-refractive index layers, to thereby suppress the incident angle dependence.

Further, Patent Document 2 proposes that an $Al_2O_3$ layer or the like whose refractive index is slightly higher than that of a $SiO_2$ layer is used as a low-refractive index layer to suppress an incident angle dependence in a cut wavelength from a transmission band to a stop band on a near-infrared side, and in addition to that, an optical multilayer with a normal configuration whose cut wavelength is on a longer wavelength side is used to supplement a decrease in a stop band caused by a decrease in a difference of refractive index.

Patent Document 3 proposes that a low-refractive index layer is replaced with an $Al_2O_3$ layer or the like having a refractive index larger than that of a $SiO_2$ layer, and further, a proportion of a high-refractive index layer such as a $TiO_2$ layer in an optical layer thickness ratio is increased to suppress an incident angle dependence.

As described above, the propositions of Patent Documents 1 to 3 are based on the concept that the incident angle dependence caused by the low-refractive index layer is suppressed by increasing the proportion of the high-refractive index layer or by increasing the refractive index of the low-refractive index layer in an alternating multilayer formed of the high-refractive index layer and the low-refractive index layer.

Incidentally, in a near-infrared cut filter, for combination use with a near-infrared absorption type color glass filter, for example, it is essential to provide a very wide transmission band in a visible region and wide stop bands on an ultraviolet side and a near-infrared side of the transmission band, and it is required that an incident angle dependence of each of two cut wavelengths in a rising of a transmittance on the ultraviolet side and a falling of a transmittance on a near-infrared side is small.

However, when the refractive index of the low-refractive index layer is increased, the incident angle dependence cannot be sufficiently suppressed unless the refractive index is increased in an extreme manner. Further, when the refractive index of the low-refractive index layer is excessively increased, the difference between the refractive index of the high-refractive index layer and the refractive index of the low-refractive index layer becomes too small. As a result of this, the transmission band becomes too wide, and on the other hand, the transmittance in the stop band does not become sufficiently low and the stop band becomes very narrow, in which the stop band on the ultraviolet region side in particular is not formed sufficiently. Further, when the proportion of the high-refractive index layer in the optical layer thickness ratio between the high-refractive index layer and the low-refractive index layer is excessively increased without increasing the refractive index of the low-refractive index layer, the stop band can be sufficiently widened, but, the transmission band becomes narrow.

As described above, with the use of the propositions disclosed in Patent Documents 1 to 3, it is not possible to sufficiently suppress the incident angle dependence under the present situation.

The present invention has been made in consideration of the above-described problems, and an object thereof is to provide a near-infrared cut filter capable of suppressing an incident angle dependence.

It is characterized in that a near-infrared cut filter according to the present invention is a near-infrared cut filter including a transparent substrate and an optical multilayer provided on at least one main surface of the transparent substrate, in which the optical multilayer is formed of a high-refractive index layer having a refractive index of 2.0 or more, and a low-refractive index layer having a refractive index of 1.6 or less at a wavelength of 500 nm, and the optical multilayer has a repeating structure of $(a_n Q_H, b_n Q_L, c_n Q_H, d_n Q_L)^n$ when a QWOT at the wavelength of 500 nm of the high-refractive index layer is set to $Q_H$, and a QWOT at the wavelength of 500 nm of the low-refractive index layer is set to $Q_L$, in which an average value of the an is not less than 1.5 nor more than 2.5, and a value obtained by averaging average values of the respective $b_n$, $c_n$, and $d_n$ is 1.0 or less.

According to the present invention, an optical multilayer is formed of a high-refractive index layer having a refractive index of 2.0 or more, and a low-refractive index layer having a refractive index of 1.6 or less at a wavelength of 500 nm, and the optical multilayer has a repeating structure of $(a_n Q_H, b_n Q_L, c_n Q_H, d_n Q_L)^n$ when a QWOT at the wavelength of 500 nm of the high-refractive index layer is set to $Q_H$, and a QWOT at the wavelength of 500 nm of the low-refractive index layer is set to $Q_L$, in which an average value of the $a_n$ is not less than 1.5 nor more than 2.5, and a value obtained by averaging average values of the respective $b_n$, $c_n$, and $d_n$ is 1.0 or less. Accordingly, it is possible to provide a near-infrared cut filter in which an incident angle dependence is suppressed.

DETAILED DESCRIPTION (Embodiment)

Figure 1:
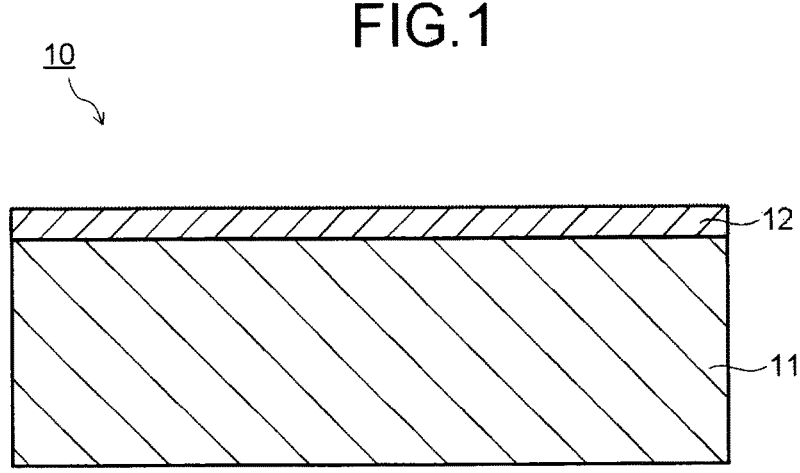
FIG. 1 is a sectional configuration diagram of a near-infrared cut filter according to an embodiment.

Hereinafter, a near-infrared cut filter of the present invention will be described while referring to the drawings.

FIG. 1 is a sectional configuration diagram of a near-infrared cut filter 10 (hereinafter, referred to as IRCF 10) according to an embodiment. As illustrated in FIG. 1, the IRCF 10 includes a transparent substrate 11, and an optical multilayer 12 provided on at least one main surface of the transparent substrate 11. Note that the optical multilayer 12 may be provided on one main surface of the transparent substrate 11, or may also be dividedly provided on both main surfaces of the transparent substrate 11 respectively.

(Transparent Substrate 11)

A material of the transparent substrate 11 is not particularly limited as long as it can transmit at least light in a visible wavelength region. As the material of the transparent substrate 11, there can be cited, for example, a glass, crystals such as crystalline quartz, lithium niobate, and sapphire, polyester resins such as polyethylene terephthalate (PET) and polybutylene terephthalate (PBT), polyolefin resins such as polyethylene, polypropylene, and ethylene-vinyl acetate copolymer, a norbornene resin, acrylic resins such as polyacrylate, and polymethyl methacrylate, a urethane resin, a vinyl chloride resin, a fluorocarbon resin, a polycarbonate resin, a polyvinyl butyral resin, a polyvinyl alcohol resin and so on.

As the transparent substrate 11, one that absorbs light in a near-infrared wavelength region is particularly preferable. This is because an image quality close to human visibility characteristics can be obtained by using the transparent substrate 11 that absorbs the light in the near-infrared wavelength region. Further, the optical multilayer 12 suppresses the incident angle dependence and has a wide transmission band in a visible wavelength region, so that it is possible to make characteristics of the transparent substrate 11 having absorption in a near-infrared wavelength region to be effectively exhibited by the transmission band.

Specifically, with the use of the optical multilayer 12, it is possible to secure a wide transmission band in the visible wavelength region while suppressing the incident angle dependence, and to form proper stop bands on both sides of the transmission band. When a conventional optical multilayer formed by alternately stacking a high-refractive index layer and a low-refractive index layer is used to try to suppress a wavelength shift, a width of the transmission band is not always sufficiently wide. Further, also in the various methods disclosed in the publicly-known examples and the like, the problem arises such that it is difficult to adjust the transmission band within a proper range. For this reason, in a filter obtained by forming the conventional optical multilayer on the transparent substrate 11, spectral characteristics on an ultraviolet side or an infrared side of the visible wavelength region become different from the spectral characteristics of the transparent substrate 11, which leads to a possibility that spectral characteristics required with respect to a solid-state imaging device cannot be obtained.

Note that as the transparent substrate 11 that absorbs the light in the near-infrared wavelength region, there can be cited an absorption-type glass made by adding $Cu^{2+}$ ions to fluorophosphate-based glass or phosphate-based glass, for example. Further, one made by adding an absorbent that absorbs the near-infrared light into a resin material may also be used. As the absorbent, for example, dye, pigment, a metal complex-based compound can be cited, and concretely, there can be cited a phthalocyanine-based compound, a naphthalocyanine-based compound, and a dithiol metal complex-based compound.

(Optical Multilayer 12)

Figure 2:
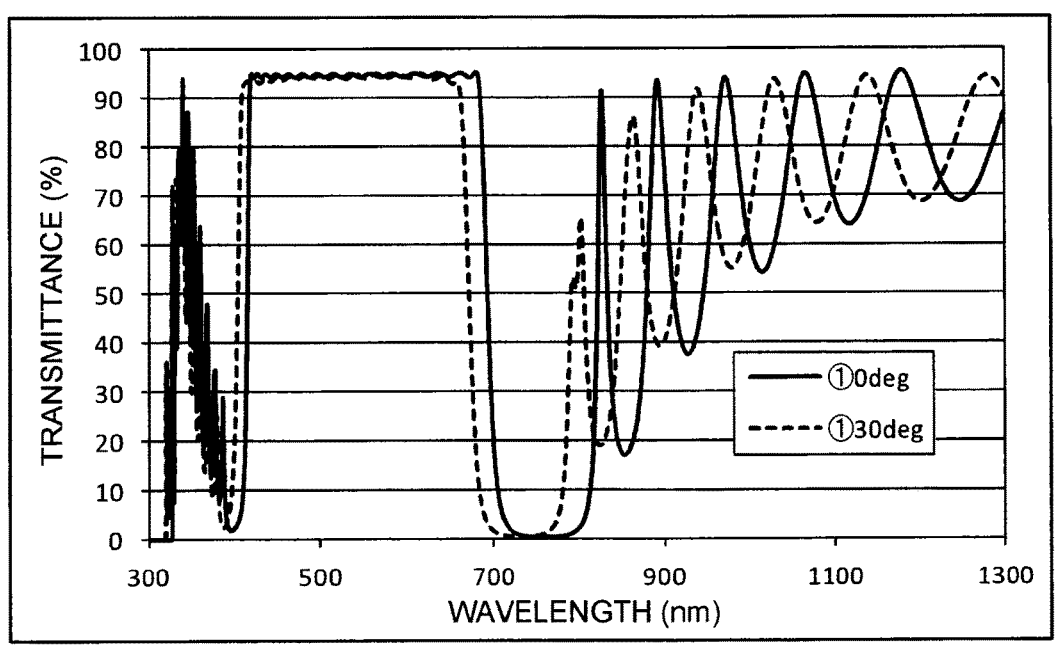
FIG. 2 is a spectral characteristic diagram of an optical multilayer according to the embodiment.
Figure 3:
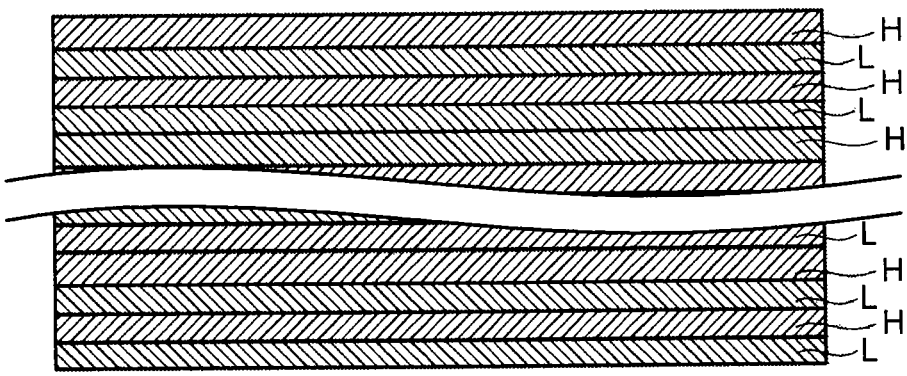
FIG. 3 is an enlarged sectional diagram of the optical multilayer according to the embodiment.

FIG. 2 is a spectral characteristic diagram of the optical multilayer 12. FIG. 3 is an enlarged sectional diagram of the optical multilayer 12. Hereinafter, the optical multilayer 12 will be described while referring to FIG. 2 and FIG. 3. Note that a structure of the optical multilayer 12 will be described while referring to FIG. 3 after explaining the spectral characteristics of the optical multilayer 12 while referring to FIG. 2.

(Spectral Characteristics of Optical Multilayer 12)

As illustrated in FIG. 2, a shift amount of a half-value wavelength of a transmission band of the optical multilayer 12 under a 0° incident condition (a condition where light is incident perpendicular to a main surface of the optical multilayer 12) and under a 30° incident condition (a condition where light is incident on the main surface of the optical multilayer 12 in a state of being inclined by 30° from a perpendicular state), is preferably 25 nm or less, and is more preferably 23 nm or less on a near-infrared (IR) side. Further, a shift amount of the half-value wavelength of the transmission band of the optical multilayer 12 between the 0° incident condition and the 30° incident condition, is preferably 13 nm or less, more preferably 12 nm or less, and is still more preferably 10 nm or less on an ultraviolet (UV) side. Note that the half-value wavelength in the present embodiment indicates a wavelength when a transmittance of the optical multilayer 12 is 50%.

Further, under the 0° incident condition, the optical multilayer 12 has a transmission band where an average transmittance becomes 85% or more in a wavelength range of 400 to 700 nm, and stop bands in each of which an average transmittance becomes 5% or less, located on the ultraviolet side and on the near-infrared side, respectively, of the transmission band. Further, a difference between a half-value wavelength on the ultraviolet side and a half-value wavelength on the near-infrared side of the transmission band of the optical multilayer 12 is preferably 200 nm or more, more preferably 250 nm or more, and is still more preferably 270 nm or more.

Note that it is preferable that the optical multilayer 12 further satisfies the following requirements in the spectral characteristics under the 0° incident condition. Concretely, the difference between the half-value wavelength on the ultraviolet side and the half-value wavelength on the near-infrared side of the transmission band of the optical multilayer 12 is preferably 300 nm or less. Further, the half-value wavelength on the ultraviolet side preferably falls within a range of 390 to 430 nm, and the half-value wavelength on the near-infrared side preferably falls within a range of 640 to 720 nm. Further, a width of the stop band on the ultraviolet side is preferably 5 nm or more, and is more preferably 10 nm or more. Further, a width of the stop band on the infrared side is preferably 90 nm or more, more preferably 110 nm or more, and is still more preferably 120 nm or more.

Here, it is set that a range (a range for obtaining the average transmittance) of the transmission band of the optical multilayer 12 is from a wavelength (a base point on the ultraviolet side) when a decrease in transmittance starts from the transmission band toward the stop band on the ultraviolet side to a wavelength (a base point on the near-infrared side) when a decrease in transmittance starts from the transmission band toward the stop band on the near-infrared side. Further, a range (a range for obtaining the average transmittance and the width) of each of the stop bands of the optical multilayer 12 indicates a range where the transmittance becomes 5% or less, on both of the ultraviolet side and the infrared side.

(Structure of Optical Multilayer 12)

In order to satisfy the above-described spectral characteristics, the optical multilayer 12 of the present invention has a structure in which a high-refractive index layer having a refractive index of 2.0 or more at a wavelength of 500 nm and a low-refractive index layer having a refractive index of 1.6 or less at the wavelength of 500 nm are stacked, as illustrated in FIG. 3. Concretely, the optical multilayer 12 can be represented by the following expression when a QWOT (Quarter-wave Optical Thickness) at the wavelength of 500 nm of the high-refractive index layer is set to $Q_H$, and a QWOT at the wavelength of 500 nm of the low-refractive index layer is set to $Q_L$.

$$(a_n Q_H, b_n Q_L, c_n Q_H, d_n Q_L)^{\wedge} n \text{ (n: natural number of 1 or more)}$$

Specifically, the optical multilayer 12 of the present invention has a structure in which n number of base units $(a_n Q_H, b_n Q_L, c_n Q_H, d_n Q_L)$ are stacked.

Here, each of $a_n$, $b_n$, $c_n$, and $d_n$ is a coefficient in each base unit, and represents that a physical layer thickness of a layer in each base unit corresponds to a product as a result of multiplying the QWOT by that number. Accordingly, each of $a_n Q_H$, $b_n Q_L$, $c_n Q_H$, and $d_n Q_L$ indicates an optical layer thickness of each layer. Here, in order to satisfy the aforementioned spectral characteristics, it is preferable that an average value A of the coefficients $a_n$ represented by the following expression (1) is not less than 1.5 nor more than 2.5.

$$A=(a_1+a_2+ \ldots +a_n)/n(n: \text{natural number of 1 or more}) \quad (1)$$

Further, it is preferable that a value obtained by averaging an average value B of the coefficients $b_n$, an average value C of the coefficients $C_n$, and an average value D of the coefficients $d_n$ represented by the following expression (2) to expression (4), is 1.0 or less.

$$B=(b_1+b_2+ \ldots +b_n)/n(n: \text{natural number of 1 or more}) \quad (2)$$

$$C=(c_1+c_2+ \ldots +c_n)/n(n: \text{natural number of 1 or more}) \quad (3)$$

$$D=(d_1+d_2+ \ldots +d_n)/n(n: \text{natural number of 1 or more}) \quad (4)$$

When the above-described conditions are represented by expressions, the following expression (5) and expression (6) are given. Specifically, the average values A to D of the coefficients $a_n$ to $d_n$ preferably satisfy the following expression (5) and expression (6), in order to satisfy the aforementioned spectral characteristics.

$$1.5 \leq A \leq 2.5 \quad (5)$$

$$(B+C+D)/3 \leq 1.0 \quad (6)$$

Here, the spectral characteristics are improved as the number n (n is an integer) of stacking the above-described base units ($a_nQ_H$, $b_nQ_L$, $c_nQ_H$, $d_nQ_L$) is increased. For this reason, n is preferably 9 or more. However, generally, the productivity is lowered when the number of layers is increased, so that n is preferably 25 or less.

Further, in order to sufficiently secure the widths of the transmission band and the stop band on the infrared (IR) side, the average value C of the coefficients $c_n$ is preferably 0.5 or less, and is more preferably 0.4 or less. However, when the value of the coefficient $c_n$ is made to be too small, the layer thickness becomes too thin, resulting in that a control of the layer thickness at a time of layer formation becomes difficult. Therefore, the average value of the coefficients C is preferably set to 0.2 or more.

Specifically, in order to sufficiently secure the widths of the transmission band and the stop band on the infrared side, the average value C of the coefficients $c_n$ preferably satisfies the following expression (7).

$$0.2 \leq C \leq 0.5 \quad (7)$$

Further, regarding the stop band on the ultraviolet (UV) side as well, in order to sufficiently secure the width of the stop band, the values of the coefficients $b_n$ and $d_n$ preferably satisfy the following expression (8).

$$1.1 \leq \text{Average}(\max(b_n/d_n, d_n/b_n)) \leq 2.5 \quad (8)$$

Note that n is a natural number of 1 or more.

The expression (8) indicates that $b_n/d_n$, and $d_n/b_n$ in each of the repeatedly stacked base units are calculated, and a value obtained by averaging larger values of the calculated $b_n/d_n$ and $d_n/b_n$ is not less than 1.1 nor more than 2.5.

Note that when the value of the coefficient $b_n$ and the value of the coefficient $d_n$ are close to each other (namely, when $b_n/d_n$, or $d_n/b_n$ is close to 1), the width of the stop band on the ultraviolet side tends to be narrow. Conversely, if the value of the coefficient $b_n$ and the value of the coefficient $d_n$ are deviated (namely, when $b_n/d_n$, or $d_n/b_n$ is close to 2.5), it is easy to secure the width of the stop band on the ultraviolet side. Further, when the width of the stop band on the ultraviolet side is secured by using this method, it is possible to obtain a rising waveform on the ultraviolet side with high sharp cut without increasing the number of layers.

Note that the high-refractive index layer is not particularly limited as long as it is made of a material having a refractive index of 2.0 or more at the wavelength of 500 nm. As the material with the high refractive index as described above, titanium oxide ($TiO_2$), tantalum oxide ($Ta_2O_5$), niobium oxide ($Nb_2O_5$) or a composite oxide thereof can be preferably cited. Further, if the refractive index is 2.0 or more, the material may contain an additive. Note that the material with a higher refractive index is more advantageous for suppressing the amount of wavelength shift at oblique incidence, expansion of the stop band on the ultraviolet side and so on. For this reason, among the above-described three materials, titanium oxide and niobium oxide with higher refractive index are more suitable for the high-refractive index layer.

Further, the low-refractive index layer is not particularly limited as long as it is made of a material having a refractive index of 1.6 or less at the wavelength of 500 nm. A preferable example of the material with the low refractive index as described above is silicon oxide ($SiO_2$). Further, the material may contain an additive as long as its refractive index is 1.6 or less.

The high-refractive index layer and the low-refractive index layer configuring the optical multilayer 12 can be formed by a sputtering method, a vacuum deposition method, an ion-assisted vacuum deposition method, and a CVD method, and it is particularly preferable to form the layers by the sputtering method, the vacuum deposition method, or the ion-assisted vacuum deposition method. The transmission band is a wavelength band utilized for receiving light by a solid-state imaging device such as a CCD and a CMOS, and its layer thickness accuracy is important. The sputtering method, the vacuum deposition method, and the ion-assisted vacuum deposition method are excellent in layer thickness control when forming a thin layer. Therefore, it is possible to increase the accuracy of the layer thicknesses of the high-refractive index layer and the low-refractive index layer configuring the optical multilayer 12, resulting in that the wavelength shift can be suppressed.

Note that layers, other than those configuring the optical multilayer 12, such as an adherence enhancing layer, an antistatic layer on an uppermost surface layer (on the air side) may be stacked on the optical multilayer 12.

As described above, the configuration of the optical multilayer is set to employ the structure in which the base units of ($a_nQ_H$, $b_nQ_L$, $c_nQ_H$, $d_nQ_L$) are repeatedly stacked, in which the average value A of the coefficients $a_n$ is set to not less than 1.5 nor more than 2.5, and the average value (B+C+D)/3 of the average values B to D of the coefficients $b_n$, $c_n$, and $d_n$ is set to 1.0 or less. Specifically, since it is configured such that the average values A to D of the coefficients $a_n$, $b_n$, $c_n$, and $d_n$ satisfy the following expression (5) and expression (6), it is possible to suppress the incident angle dependence in which the spectral waveform shifts to the ultraviolet side when the incident angle of light is increased.

$$1.5 \leq A \leq 2.5 \quad (5)$$

$$(B+C+D)/3 \leq 1.0 \quad (6)$$

Further, since it is configured such that the average value C of the coefficients $c_n$ is not less than 0.2 nor more than 0.5, and is preferably not less than 0.2 nor more than 0.4, namely, the value satisfies the following expression (7), it is possible to sufficiently secure the widths of the transmission band and the stop band on the infrared (IR) side. Further, it is possible to suppress an occurrence of situation where the layer thickness is reduced too much and it becomes difficult to control the layer thickness at the time of layer formation.

$$0.2 \leq C \leq 0.5 \quad (7)$$

Further, regarding the stop band on the ultraviolet (UV) side as well, in order to sufficiently secure the width of the stop band, the values of the coefficients $b_n$ and $d_n$ are set to satisfy the following expression (8), so that it is possible to sufficiently secure the width of the stop band on the ultraviolet (UV) side as well.

$$1.1 \leq \text{Average}(\max(b_n/d_n, d_n/b_n)) \leq 2.5 \quad (8)$$

(Modified Example of Embodiment)

Figure 4:
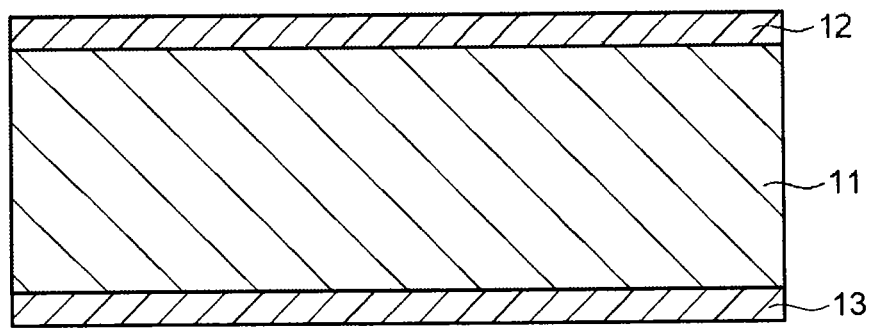
FIG. 4 is a sectional configuration diagram of a near-infrared cut filter according to a modified example of the embodiment.

FIG. 4 is a sectional configuration diagram of a near-infrared cut filter 10A (hereinafter, referred to as IRCF 10A) according to a modified example of the embodiment. The optical multilayer 12 of the near-infrared cut filter 10 explained by referring to FIG. 1 to FIG. 3 mainly forms the transmission band and the cut-off bands on both sides of the transmission band. Accordingly, there is a case where stop bands with sufficient widths in accordance with requirements cannot be formed. Therefore, an optical multilayer 13 for expanding stop bands (hereinafter, refer to as stop-band-expanding optical multilayer 13) for expanding the stop bands on the ultraviolet side and the near-infrared side, may be formed on one main surface of the transparent substrate 11, in order to expand the stop bands on the ultraviolet side and the near-infrared side of the IRCF 10A, as illustrated in FIG. 4.

Hereinafter, a configuration of the IRCF 10A according to the modified example of the embodiment will be described while referring to FIG. 4, in which a configuration same as that of the IRCF 10 explained while referring to FIG. 1 to FIG. 3 is denoted by the same reference numeral, and overlapped explanation thereof will be omitted. Further, although the stop-band-expanding optical multilayer 13 is provided on a main surface side which is different from the main surface side of the transparent substrate 11 on which the optical multilayer 12 is provided in FIG. 4, it is also possible to set such that the stop-band-expanding optical multilayer 13 is provided on the main surface side of the transparent substrate 11 on which the optical multilayer 12 is provided. In this case, the stop-band-expanding optical multilayer 13 may be provided between the transparent substrate 11 and the optical multilayer 12, or may also be provided on the optical multilayer 12.

In spectral characteristics under the 0° incident condition, for example, the stop-band-expanding optical multilayer 13 has a transmission band including the transmission band in the spectral characteristics of the optical multilayer 12, has a half-value wavelength on the ultraviolet side which is equal to or less than the half-value wavelength on the ultraviolet side in the spectral characteristics of the optical multilayer 12, and has a half-value wavelength on the near-infrared side which is greater by 7 nm or more than the half-value wavelength on the near-infrared side in the spectral characteristics of the optical multilayer.

By designing as above, even when the incident angle is changed, it is possible to provide a transmission band such as one including the transmission band formed by the optical multilayer 12, resulting in that it is possible to form the IRCF 10A in which the incident angle dependence is suppressed, and the transmission band in the visible region and the stop bands in the ultraviolet region and the near-infrared region are expanded.

Specifically, when the incident angle is changed, the half-value wavelength on the near-infrared side formed by the stop-band-expanding optical multilayer 13 is easily shifted greatly, when compared to the half-value wavelength on the near-infrared side formed by the optical multilayer 12. In the spectral characteristics under the 0° incident condition, by making the half-value wavelength on the near-infrared side formed by the stop-band-expanding optical multilayer 13 to be greater by 7 nm or more than the half-value wavelength on the near-infrared side formed by the optical multilayer 12, also when the incident angle is changed, it is possible to prevent the half-value wavelength on the near-infrared side formed by the stop-band-expanding optical multilayer 13 from being overlapped with the half-value wavelength on the near-infrared side formed by the optical multilayer 12.

On the other hand, the half-value wavelength on the ultraviolet side formed by the stop-band-expanding optical multilayer 13 is not always changed greatly, when compared to the half-value wavelength on the ultraviolet side formed by the optical multilayer 12, so that in the spectral characteristics under the 0° incident condition, if a half-value wavelength is equal to or less than the half-value wavelengths on the ultraviolet side formed by these layers, it can be prevented from being overlapped with the half-value wavelengths on the ultraviolet side formed by these layers even when the incident angle is changed.

As the stop-band-expanding optical multilayer 13 as described above, there can be cited two embodiments (a first embodiment and a second embodiment) as will be described below. Note that in the following explanation, the stop-band-expanding optical multilayer 13 according to the first embodiment is described as a stop-band-expanding optical multilayer 13A, and the stop-band-expanding optical multilayer 13 according to the second embodiment is described as a stop-band-expanding optical multilayer 13B.

(Stop-Band-Expanding Optical Multilayer 13A)

The stop-band-expanding optical multilayer 13A has a repeating structure formed of a high-refractive index layer having a refractive index of 2.0 or more, and a low-refractive index layer having a refractive index of 1.7 or less. Further, when an average optical layer thickness of the high-refractive index layers is set to $T_H$, and an average optical layer thickness of the low-refractive index layers is set to $T_L$, $T_H/T_L$ is preferably less than 2.

By employing such a configuration, it is possible to form the transmission band including the transmission band in the spectral characteristics of the optical multilayer 12, and to form the half-value wavelength on the ultraviolet side which is equal to or less than the half-value wavelength on the ultraviolet side in the spectral characteristics of the optical multilayer 12 and the half-value wavelength on the near-infrared side which is greater by 7 nm or more than the half-value wavelength on the near-infrared side in the spectral characteristics of the optical multilayer 12. Specifically, when the $T_H/T_L$ becomes 2 or more, it is easy to suppress the incident angle dependence, but, the transmission band becomes narrow. By setting the $T_H/T_L$ to less than 2, the incident angle dependence cannot be always suppressed, but, it is possible to form a wide transmission band such as one including the transmission band in the spectral characteristics of the optical multilayer 12.

Note that from a point of view of obtaining the transmission band and the stop bands with sufficient widths and the predetermined half-value wavelengths, the number of layers of the stop-band-expanding optical multilayer 13A is preferably 20 or more, and is more preferably 30 or more. An upper limit value of the number of layers is not particularly limited, but, generally, the productivity is lowered when the number of layers is increased, so that the upper limit value is preferably 150 or less, and is more preferably 100 or less.

The ratio $T_H/T_L$ of the average optical layer thicknesses is not particularly limited, but, when it is considered that the transmission band and the stop bands with sufficient widths are obtained, particularly wide stop bands are obtained, it is better to employ a general layer designing method in which the $T_H/T_L$ ratio is about 1 with respect to a center wavelength in design at the time of designing the stop bands. This is obvious when considering the fact that the increase in the $T_H/T_L$ for the purpose of suppressing the incident angle dependence causes the decrease in the stop bands, as described previously.

The high-refractive index layer is not particularly limited as long as it is made of a material having a refractive index of 2.0 or more, and there can be cited a preferable example thereof which is made of $TiO_2$, $Ta_2O_5$, $Nb_2O_5$, or a composite oxide thereof. As the high-refractive index layer, one having a refractive index of 2.3 or more is preferable, and one having a refractive index of 2.4 or more is further preferable. As a high-refractive index layer as described above, one made of $TiO_2$ (refractive index of 2.45) can be preferably cited.

The low-refractive index layer is not particularly limited as long as it is made of a material having a refractive index of 1.7 or less, and there can be cited a preferable example thereof which is made of $SiO_2$, $MgF_2$, or a composite oxide thereof (Stop-Band-Expanding Optical Multilayer 13B)

The stop-band-expanding optical multilayer 13B has an ultraviolet-side stop band forming part for forming the stop band on the ultraviolet side, and a near-infrared-side stop band forming part for forming the stop band on the near-infrared side. The ultraviolet-side stop band forming part has a repeating structure of a high-refractive index layer having a refractive index of 2.0 or more and a low-refractive index layer having a refractive index of 1.7 or less. The near-infrared-side stop band forming part has a high-refractive index layer having a refractive index of 2.0 or more, a middle-refractive index layer having a refractive index of 2.0 or more and less than the refractive index of the high-refractive index layer, and a low-refractive index layer having a refractive index of 1.7 or less, and a total number of layers of the high-refractive index layer, the middle-refractive index layer, and the low-refractive index layer is 30 or more.

The stop-band-expanding optical multilayer 13B can also form a transmission band including the transmission band in the spectral characteristics of the optical multilayer 12, a half-value wavelength on the ultraviolet side which is equal to or less than the half-value wavelength on the ultraviolet side in the spectral characteristics of the optical multilayer 12, and a half-value wavelength on the near-infrared side which is greater by 7 nm or more than the half-value wavelength on the near-infrared side in the spectral characteristics of the optical multilayer 12.

Generally, it is preferable that an optical multilayer has a wide stop band on the near-infrared side, and causes a small ripple in a transmission band when an incident angle becomes large. Each of the above-described optical multilayers 12 employs a technique of suppressing the incident angle dependence, so that the generation of ripple can be suppressed to some extent, but, the stop band forming parts which do not employ the technique still cause the ripple. The stop-band-expanding optical multilayer 13A cannot always suppress such a ripple in a sufficient manner. With the use of the stop-band-expanding optical multilayer 13B, it is possible to suppress the generation of ripple while sufficiently expanding the widths of the transmission band and the stop bands.

The ultraviolet-side stop band forming part has the repeating structure of the high-refractive index layer having the refractive index of 2.0 or more and the low-refractive index layer having the refractive index of 1.7 or less, as described above.

From a point of view of forming the stop band on the ultraviolet side with a sufficient width, the number of layers of the ultraviolet-side stop band forming part is preferably 15 or more, and is more preferably 20 or more. An upper limit value of the number of layers is not particularly limited, but, generally, the productivity is lowered when the number of layers is increased, so that the upper limit value is preferably 60 or less, and is more preferably 40 or less.

The high-refractive index layer is not particularly limited as long as it is made of a material having a refractive index of 2.0 or more, and there can be cited a preferable example thereof which is made of $TiO_2$, $Ta_2O_5$, $Nb_2O_5$, or a composite oxide thereof. As the high-refractive index layer, one having a refractive index of 2.3 or more is preferable, and one having a refractive index of 2.4 or more is further preferable. As a high-refractive index layer as described above, one made of $TiO_2$ (refractive index of 2.45) can be preferably cited.

The low-refractive index layer is not particularly limited as long as it is made of a material having a refractive index of 1.7 or less, and there can be cited a preferable example thereof which is made of $SiO_2$, $MgF_2$, or a composite oxide thereof.

The near-infrared-side stop band forming part has the high-refractive index layer having the refractive index of 2.0 or more, the middle-refractive index layer having the refractive index of 2.0 or more and less than the refractive index of the high-refractive index layer, and the low-refractive index layer having the refractive index of 1.7 or less. The total number of layers of the high-refractive index layer, the middle-refractive index layer, and the low-refractive index layer is 30 or more.

The number of layers of the near-infrared-side stop band forming part is not particularly limited as long as it is 30 or more, but, from a point of view of forming the stop band on the near-infrared side with further sufficient width, the number of layers is preferably 40 or more, and is more preferably 60 or more. An upper limit value of the number of layers is not particularly limited, but, generally, the productivity is lowered when the number of layers is increased, so that the upper limit value is preferably 150 or less, and is more preferably 100 or less.

When the high-refractive index layer is set to H, the middle-refractive index layer is set to M, and the low-refractive index layer is set to L, the high-refractive index layer, the middle-refractive index layer, and the low-refractive index layer are stacked to have a repeating structure of base units as described below, for example.

Base Unit: (HML)

Base unit: (LMHML)

When the repeating structure as described above is employed, regarding an average optical layer thickness $T_H$, an average optical layer thickness $T_M$, and an average optical layer thickness $T_L$, a portion having HML as the base unit is preferably represented by $T_H:T_M:T_L$=approximately 1:1:1, and a portion having LMHML as the base unit is preferably represented by $T_H:T_M:T_L$=approximately 1:1:2, which are approximate ratios in a general layer design, from a point of view of obtaining sufficiently wide stop bands.

Note that the reason why the $T_L$ ratio in the latter becomes 2 is because in the repetition of LMHML, two Ls are continued such as LL, and thus the ratio becomes 2 in the final layer design, and the basic concept is not different from $T_H:T_M:T_L$=1:1:1. Details will be described later. Note that the employment of general ratios here is based on the concept that the optical layer thickness ratio is not changed greatly since the stop band becomes narrow when the ratios of $T_H$ and $T_M$ are increased.

Further, it is better and preferable that each of the stop band forming parts employs a general method in which two or more design wavelengths are applied to the above-described repeating structure to realize the expansion of the stop band. In this case, the aforementioned ratio is set for each center wavelength in design.

The near-infrared-side stop band forming part cuts light in a wide range of near-infrared region, but, as the IRCF 10 used for the CCD and the CMOS, it is preferable that the part can cut light on a longer wavelength side. It is preferable that the part can cut light preferably in 900 nm or more, more preferably in 1100 nm or more, and still more preferably in 1150 nm or more. When the above-described method is used, it becomes possible to suppress the generation of ripple when the incident angle becomes large, while expanding the stop band to the longer wavelength side.

Note that the near-infrared-side stop band forming part does not necessarily strictly have the repeating structure of the base units described above. For example, in the case of the low-refractive index layer and the like in which the refractive index is small, when the optical layer thickness becomes small, it becomes difficult to control the layer thickness at the time of layer formation, so that there is no problem if a part of a plurality of low-refractive index layers is omitted, and accordingly, there is a portion where a large number of the high-refractive index layers and the middle-refractive index layers are continued, for example.

Further, although the repeating structure of the base units (LMHML) can also be represented as (2LMHM) since two Ls in the adjacent base units are continued, or can also be represented as (LMHM) by regarding two Ls as one L, the average optical layer thickness in the present invention is only calculated based on a state of final form after completing the layer formation, and continued layers made of the same material are regarded as one layer to determine a physical layer thickness and the number of layers, thereby determining an average optical layer thickness by using the physical layer thickness and the number of layers.

The high-refractive index layer and the middle-refractive index layer are not particularly limited as long as they are made of a material having a refractive index of 2.0 or more, and there can be cited a preferable example thereof which is made of $TiO_2$, $Ta_2O_5$, $Nb_2O_5$, or a composite oxide thereof. As the high-refractive index layer, one having a refractive index of 2.3 or more is preferable, and one having a refractive index of 2.4 or more is further preferable. As a high-refractive index layer as described above, one made of $TiO_2$ (refractive index of 2.45) can be preferably cited. The middle-refractive index layer is not particularly limited as long as it has a refractive index which is less than the refractive index of the high-refractive index layer, and one having a refractive index of 2.0 or more and less than 2.3 is preferable, and one having a refractive index of not less than 2.0 nor more than 2.2 is more preferable. As a middle-refractive index layer as described above, one made of $Ta_2O_5$ (refractive index of 2.13) can be preferably cited.

The low-refractive index layer is not particularly limited as long as it is made of a material having a refractive index of 1.7 or less, and there can be cited a preferable example thereof which is made of $SiO_2$, $MgF_2$, or a composite oxide thereof.

The middle-refractive index layer in the near-infrared-side stop band forming part is not necessarily limited to one made of a single layer, and it may also be formed as an equivalent layer configured by a layer having a refractive index same as that of the high-refractive index layer, and a layer having a refractive index same as that of the low-refractive index layer, for example. The use of the equivalent layer is preferable since it is possible to form the middle-refractive index layer even when, for example, the number of types of layers capable of being formed in a layer forming apparatus is two.

(Imaging Apparatus 100)

Each of the IRCF 10 described while referring to FIG. 1 to FIG. 3, and the IRCF 10A described while referring to FIG. 4 is used as, for example, a luminous factor correction filter in an imaging apparatus such as a digital still camera, a digital video camera, a monitoring camera, a camera for automobile use, and a web camera, an automatic exposure meter and the like. In the imaging apparatus such as a digital still camera, a digital video camera, a monitoring camera, a camera for automobile use, and a web camera, each of the IRCF 10 and the IRCF 10A is disposed, for example, between an imaging lens and a solid-state imaging device. In the automatic exposure meter, each of the IRCF 10 and the IRCF 10A is disposed, for example, in front of a light-receiving element.

In the imaging apparatus, each of the IRCF 10 and the IRCF 10A may be disposed at a position away from the front surface of the solid-state imaging device or may be directly bonded to the solid-state imaging device or a package of the solid-state imaging device, or a cover that protects the solid-state imaging device may be formed of each of the IRCF 10 and the IRCF 10A. Further, each of the IRCF 10 and the IRCF 10A may be directly bonded to a low-pass filter using crystals such as crystalline quartz and lithium niobate for suppressing moire and false color.

Figure 5:
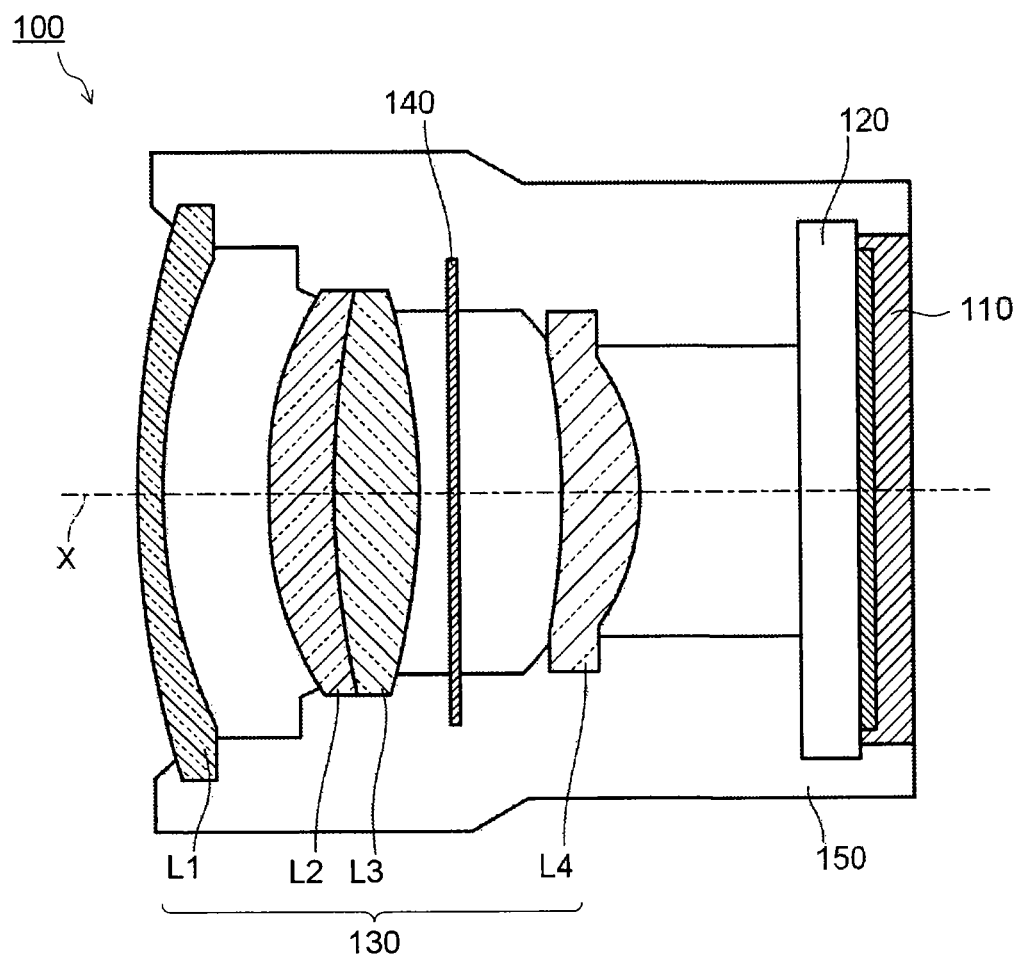
FIG. 5 is a partial configuration diagram of an imaging apparatus which uses the near-infrared cut filter according to the embodiment.

Next, a concrete example will be illustrated. FIG. 5 is a partial configuration diagram of the imaging apparatus 100.

The imaging apparatus 100 is, for example, a digital still camera, a digital video camera, a monitoring camera, a camera for automobile use, or a web camera. The imaging apparatus 100 includes a solid-state imaging device 110, a cover glass 120, a lens group 130, a diaphragm 140, and a housing 150. The solid-state imaging device 110, the cover glass 120, the lens group 130, and the diaphragm 140 are disposed along an optical axis x.

The solid-state imaging device 110 is, for example, a CCD (Charge Coupled Device) image sensor or a CMOS (Complementary Metal Oxide Semiconductor) image sensor. The solid-state imaging device 110 converts input light into an electric signal, and outputs the electric signal to a not-illustrated image signal processing circuit.

The cover glass 120 is disposed on an imaging plane side (lens group 130 side) of the solid-state imaging device 110 to protect the solid-state imaging device 110 from an external environment.

The lens group 130 is disposed on the imaging plane side of the solid-state imaging device 110. The lens group 130 is formed of a plurality of lenses L1 to L4, and guides light incident thereon to the imaging plane of the solid-state imaging device 110.

The diaphragm 140 is disposed between the lens L3 and the lens L4 of the lens group 130. The diaphragm 140 is configured to be able to adjust an amount of light passing therethrough.

The housing 150 houses the solid-state imaging device 110, the cover glass 120, the lens group 130, and the diaphragm 140.

In the imaging apparatus 100, light incident thereon from an object side passes through the lens L1, the lens L2, the third lens L3, the diaphragm 140, the lens L4, and the cover glass 120, and is incident on the solid-state imaging device 110. The incident light is converted into an electric signal by the solid-state imaging device 110, and the electric signal is output as an image signal.

Each of the IRCF 10 and the IRCF 10A is used as, for example, the cover glass 120, the lens group 130, namely, the lens L1, the lens L2, the lens L3, or the lens L4. In other words, the optical multilayer 12 of the IRCF 10 is provided on the surface of the transparent substrate 11 that configures the cover glass or the lens group of the conventional imaging apparatus.

By applying each of the IRCF 10 and the IRCF 10A to the cover glass 120 or the lens group 130 of the imaging apparatus 100, it is possible to expand the transmission band in the visible region and the stop bands in the ultraviolet region and the near-infrared region while suppressing the incident angle dependence, thereby improving its characteristics.

(Other Embodiments)

The present invention has been described in detail based on the above concrete examples as described above, but, the present invention is not limited to the above concrete examples, and any modification and change can be made without departing from the scope of the present invention.

EXAMPLES

Next, concrete description will be made while referring to examples.

A near-infrared cut filter (IRCF) according to each of examples 1 to 11 and comparative examples 1 to 3 includes a transparent substrate (high transparency glass), and an optical multilayer provided on one surface of the transparent substrate. Regarding the respective IRCFs, the inventors examined spectral characteristics of the optical multilayer 12 under the 0° incident condition (the condition where light is incident perpendicular to a main surface of the optical multilayer 12) and under the 30° incident condition (the condition where light is incident on the main surface of the optical multilayer 12 in a state of being inclined by 30° from a perpendicular state) explained while referring to FIG. 2 and FIG. 3, in cases where titanium oxide ($TiO_2$), niobium oxide ($Nb_2O_5$), and tantalum oxide ($Ta_2O_5$) were used as the material of the high-refractive index layer, and silicon oxide ($SiO_2$) was used as the material of the low-refractive index layer. Note that in all of the examples and the comparative examples, the optical multilayer is stacked on the transparent substrate so that a layer with a layer number 1 described in layer conditions is disposed on the transparent substrate side, and a layer with a large value of layer number is disposed on the air side.

Note that the spectral characteristics were investigated using optical thin layer simulation software (TFCalc, manufactured by Software Spectra Inc.). Further, the refractive indices of the respective layers at the wavelength of 500 nm are used as representative values in this application, but, simulations were made in consideration of the wavelength dependence of the refractive indices in the simulations.

The refractive index has a wavelength dependence called dispersion or the like. For example, in a wavelength range of 300 to 1300 nm, there is a tendency that the refractive index is higher as the wavelength is shorter and the refractive index decreases as the wavelength increases, in layer materials that are targets of this application. The wavelength-refractive index relationship is often expressed not using a linear relationship but generally using an approximate expression such as Hartmann, Sellmeier. Further, the refractive index (dispersion) of the layer material varies depending on various layer formation conditions. Therefore, layer formation was actually performed by the vapor deposition method, the ion-assisted vapor deposition method, the sputtering method and the like, and obtained dispersion data of the refractive indices of the respective layers was used in the following simulations.

Examples 1 to 4

First, examples 1 to 4 will be described. In each of the examples 1 to 4, titanium oxide ($TiO_2$) was used as the material of the high-refractive index layer, and silicon oxide ($SiO_2$) was used as the material of the low-refractive index layer. Note that spectral characteristics were simulated by setting a refractive index of titanium oxide ($TiO_2$) at a wavelength of 500 nm to 2.47, and setting a refractive index of silicon oxide ($SiO_2$) at the wavelength of 500 nm to 1.48. Hereinafter, layer conditions in the examples 1 to 4 are presented in Tables 1 to 4, and simulation results of the examples 1 to 4 are presented in FIG. 6 to FIG. 9. Note that a "layer thickness" in Tables 1 to 4 indicates a physical layer thickness. Further, a "coefficient value" is a coefficient indicating that the physical layer thickness corresponds to a product as a result of multiplying the QWOT by what number.

Example 1

TABLE 1

| Layer number | Layer material | Layer thickness d [nm] | Coefficient value |
|---|---|---|---|
| 1 | $TiO_2$ | 106.18 | 2.0981168 |
| 2 | $SiO_2$ | 83.64 | 0.9902976 |
| 3 | $TiO_2$ | 12.68 | 0.2505568 |
| 4 | $SiO_2$ | 41.87 | 0.4957408 |
| 5 | $TiO_2$ | 77.08 | 1.5231008 |
| 6 | $SiO_2$ | 42.00 | 0.4972800 |
| 7 | $TiO_2$ | 22.14 | 0.4374864 |
| 8 | $SiO_2$ | 43.76 | 0.5181184 |
| 9 | $TiO_2$ | 79.74 | 1.5756624 |
| 10 | $SiO_2$ | 33.03 | 0.3910752 |
| 11 | $TiO_2$ | 24.18 | 0.4777968 |
| 12 | $SiO_2$ | 45.71 | 0.5412064 |
| 13 | $TiO_2$ | 83.08 | 1.6416608 |
| 14 | $SiO_2$ | 27.51 | 0.3257184 |
| 15 | $TiO_2$ | 24.45 | 0.4831320 |
| 16 | $SiO_2$ | 47.46 | 0.5619264 |
| 17 | $TiO_2$ | 87.72 | 1.7333472 |
| 18 | $SiO_2$ | 23.80 | 0.2817920 |
| 19 | $TiO_2$ | 23.37 | 0.4617912 |
| 20 | $SiO_2$ | 48.38 | 0.5728192 |
| 21 | $TiO_2$ | 93.06 | 1.8388656 |
| 22 | $SiO_2$ | 22.28 | 0.2637952 |

TABLE 1-continued

| Layer number | Layer material | Layer thickness d [nm] | Coefficient value |
|---|---|---|---|
| 23 | $TiO_2$ | 21.02 | 0.4153552 |
| 24 | $SiO_2$ | 47.94 | 0.5676096 |
| 25 | $TiO_2$ | 97.98 | 1.9360848 |
| 26 | $SiO_2$ | 23.79 | 0.2816736 |
| 27 | $TiO_2$ | 18.06 | 0.3568656 |
| 28 | $SiO_2$ | 46.10 | 0.5458240 |
| 29 | $TiO_2$ | 100.77 | 1.9912152 |
| 30 | $SiO_2$ | 27.77 | 0.3287968 |
| 31 | $TiO_2$ | 15.92 | 0.3145792 |
| 32 | $SiO_2$ | 43.47 | 0.5146848 |
| 33 | $TiO_2$ | 100.99 | 1.9955624 |
| 34 | $SiO_2$ | 31.26 | 0.3701184 |
| 35 | $TiO_2$ | 15.13 | 0.2989688 |
| 36 | $SiO_2$ | 41.80 | 0.4949120 |
| 37 | $TiO_2$ | 100.29 | 1.9817304 |
| 38 | $SiO_2$ | 32.90 | 0.3895360 |
| 39 | $TiO_2$ | 14.89 | 0.2942264 |
| 40 | $SiO_2$ | 41.68 | 0.4934912 |
| 41 | $TiO_2$ | 100.98 | 1.9953648 |
| 42 | $SiO_2$ | 34.72 | 0.4110848 |
| 43 | $TiO_2$ | 14.52 | 0.2869152 |
| 44 | $SiO_2$ | 41.41 | 0.4902944 |
| 45 | $TiO_2$ | 104.98 | 2.0744048 |
| 46 | $SiO_2$ | 39.97 | 0.4732448 |
| 47 | $TiO_2$ | 15.50 | 0.3062800 |
| 48 | $SiO_2$ | 34.04 | 0.4030336 |
| 49 | $TiO_2$ | 108.12 | 2.1364512 |
| 50 | $SiO_2$ | 42.13 | 0.4988192 |
| 51 | $TiO_2$ | 23.33 | 0.4610008 |
| 52 | $SiO_2$ | 22.43 | 0.2655712 |
| 53 | $TiO_2$ | 83.78 | 1.6554928 |
| 54 | $SiO_2$ | 64.56 | 0.7643904 |

As presented in Table 1, the optical multilayer in the example 1 has a structure in which the base units ($a_nQ_H$, $b_nQ_L$, $c_nQ_H$, $d_nQ_L$) are repeatedly stacked. 54 layers are stacked to form the layer. Further, the coefficients $a_n$, $b_n$, $c_n$, and $d_n$, and the average values A to D satisfy the following expressions. Note that the 53-th layer and the 54-th layer are layers for adjusting a ripple, so that the 53-th layer and the 54-th layer were excluded from the calculation of the coefficients $a_n$, $b_n$, $c_n$, and $d_n$, and the average values A to D.

A=1.870

B=0.423

C=0.373

D=0.497

(B+C+D)/3=0.431

Average(max($b_n/d_n,d_n/b_n$))=1.591

As described above, it can be understood that the coefficients $a_n$ to $d_n$, and the average values A to D of the optical multilayer of the example 1 satisfy the aforementioned expression (5) to expression (8).

Figure 6:
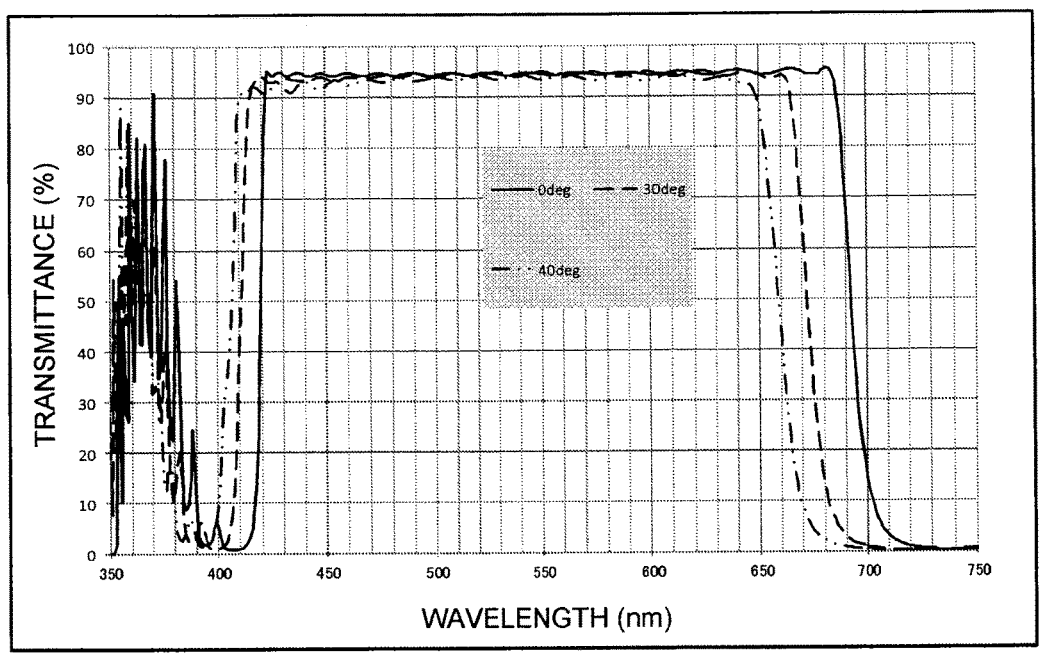
FIG. 6 illustrates simulation results of a near-infrared cut filter according to an example 1.

FIG. 6 illustrates simulation results of spectral characteristics of the optical multilayer presented in Table 1. In FIG. 6, a vertical axis indicates a transmittance, and a horizontal axis indicates a wavelength. FIG. 6 illustrates simulation results under the 0° incident condition and the 30° incident condition. As a result of the simulation, in the layer configuration presented in Table 1, a shift amount at a half-wavelength position between the case of the 0° incident condition and the case of the 30° incident condition on the near-infrared (IR) side was 20.6 nm, and that on the ultraviolet (UV) side was 9.0 nm.

Further, a difference between a half-value wavelength on the ultraviolet side and a half-value wavelength on the near-infrared side of a transmission band under the 0° incident condition was 273 nm. A range of the transmission band was from 423 nm to 682 nm. Further, the half-value wavelength on the near-infrared side was 693 nm, and the half-value wavelength on the ultraviolet side was 420 nm. A width of a stop band on the near-infrared side was 125 nm, and a width of a stop band on the ultraviolet side was 15 nm, and was 25 nm when ignoring a small ripple in the stop band.

(Consideration about Example 1)

As described above, it was found out that the optical multilayer presented in Table 1 satisfies the spectral characteristics explained while referring to FIG. 2.

Example 2

TABLE 2

| Layer number | Layer material | Layer thickness d [nm] | Coefficient value |
|---|---|---|---|
| 1 | $TiO_2$ | 93.17 | 1.8410392 |
| 2 | $SiO_2$ | 29.16 | 0.3452544 |
| 3 | $TiO_2$ | 21.03 | 0.4155528 |
| 4 | $SiO_2$ | 40.96 | 0.4849664 |
| 5 | $TiO_2$ | 93.17 | 1.8410392 |
| 6 | $SiO_2$ | 29.16 | 0.3452544 |
| 7 | $TiO_2$ | 21.03 | 0.4155528 |
| 8 | $SiO_2$ | 40.96 | 0.4849664 |
| 9 | $TiO_2$ | 93.17 | 1.8410392 |
| 10 | $SiO_2$ | 29.16 | 0.3452544 |
| 11 | $TiO_2$ | 21.03 | 0.4155528 |
| 12 | $SiO_2$ | 40.96 | 0.4849664 |
| 13 | $TiO_2$ | 93.17 | 1.8410392 |
| 14 | $SiO_2$ | 29.16 | 0.3452544 |
| 15 | $TiO_2$ | 21.03 | 0.4155528 |
| 16 | $SiO_2$ | 40.96 | 0.4849664 |
| 17 | $TiO_2$ | 93.17 | 1.8410392 |
| 18 | $SiO_2$ | 29.16 | 0.3452544 |
| 19 | $TiO_2$ | 21.03 | 0.4155528 |
| 20 | $SiO_2$ | 40.96 | 0.4849664 |
| 21 | $TiO_2$ | 93.17 | 1.8410392 |
| 22 | $SiO_2$ | 29.16 | 0.3452544 |
| 23 | $TiO_2$ | 21.03 | 0.4155528 |
| 24 | $SiO_2$ | 40.96 | 0.4849664 |
| 25 | $TiO_2$ | 93.17 | 1.8410392 |
| 26 | $SiO_2$ | 29.16 | 0.3452544 |
| 27 | $TiO_2$ | 21.03 | 0.4155528 |
| 28 | $SiO_2$ | 40.96 | 0.4849664 |
| 29 | $TiO_2$ | 93.17 | 1.8410392 |
| 30 | $SiO_2$ | 29.16 | 0.3452544 |
| 31 | $TiO_2$ | 21.03 | 0.4155528 |
| 32 | $SiO_2$ | 40.96 | 0.4849664 |
| 33 | $TiO_2$ | 93.17 | 1.8410392 |
| 34 | $SiO_2$ | 29.16 | 0.3452544 |
| 35 | $TiO_2$ | 21.03 | 0.4155528 |
| 36 | $SiO_2$ | 40.96 | 0.4849664 |
| 37 | $TiO_2$ | 93.17 | 1.8410392 |
| 38 | $SiO_2$ | 29.16 | 0.3452544 |
| 39 | $TiO_2$ | 21.03 | 0.4155528 |
| 40 | $SiO_2$ | 40.96 | 0.4849664 |
| 41 | $TiO_2$ | 93.17 | 1.8410392 |
| 42 | $SiO_2$ | 29.16 | 0.3452544 |
| 43 | $TiO_2$ | 21.03 | 0.4155528 |
| 44 | $SiO_2$ | 40.96 | 0.4849664 |
| 45 | $TiO_2$ | 93.17 | 1.8410392 |
| 46 | $SiO_2$ | 29.16 | 0.3452544 |
| 47 | $TiO_2$ | 21.03 | 0.4155528 |
| 48 | $SiO_2$ | 40.96 | 0.4849664 |
| 49 | $TiO_2$ | 93.17 | 1.8410392 |
| 50 | $SiO_2$ | 29.16 | 0.3452544 |
| 51 | $TiO_2$ | 21.03 | 0.4155528 |
| 52 | $SiO_2$ | 40.96 | 0.4849664 |

TABLE 2-continued

| Layer number | Layer material | Layer thickness d [nm] | Coefficient value |
|---|---|---|---|
| 53 | TiO$_2$ | 93.17 | 1.8410392 |
| 54 | SiO$_2$ | 29.16 | 0.3452544 |
| 55 | TiO$_2$ | 21.03 | 0.4155528 |
| 56 | SiO$_2$ | 40.96 | 0.4849664 |

As presented in Table 2, the optical multilayer in the example 2 has a structure in which the base units (a$_n$Q$_H$, b$_n$Q$_L$, c$_n$Q$_H$, d$_n$Q$_L$) are repeatedly stacked. 56 layers are stacked to form the layer. Further, the coefficients a$_n$, b$_n$, c$_n$, and d$_n$, and the average values A to D satisfy the following expressions.

A=1.839

B=0.346

C=0.415

D=0.486

(B+C+D)/3=0.416

Average(max(b$_n$/d$_n$,d$_n$/b$_n$)=1.405

As described above, it can be understood that the coefficients a$_n$ to d$_n$, and the average values A to D of the optical multilayer of the example 2 satisfy the aforementioned expression (5) to expression (8).

Figure 7:
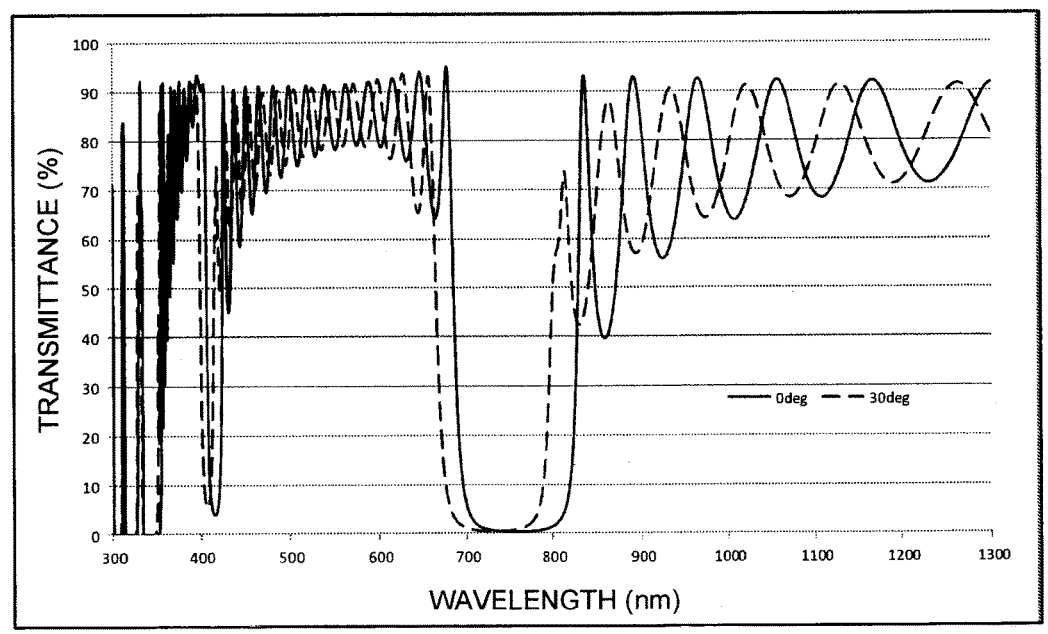
FIG. 7 illustrates simulation results of a near-infrared cut filter according to an example 2.

FIG. 7 illustrates simulation results of spectral characteristics of the optical multilayer presented in Table 2. In FIG. 7, a vertical axis indicates a transmittance, and a horizontal axis indicates a wavelength. FIG. 7 illustrates simulation results under the 0° incident condition and the 30° incident condition. As a result of the simulation, in the layer configuration presented in Table 1, a shift amount at a half-wavelength position between the case of the 0° incident condition and the case of the 30° incident condition on the near-infrared (IR) side was 20.2 nm, and that on the ultraviolet (UV) side was 9.8 nm.

Further, a difference between a half-value wavelength on the ultraviolet side and a half-value wavelength on the near-infrared side of a transmission band under the 0° incident condition was 261 nm. A range of the transmission band was from 426 nm to 678 nm. Further, the half-value wavelength on the near-infrared side was 685 nm, and the half-value wavelength on the ultraviolet side was 424 nm. A width of a stop band on the near-infrared side was 114 nm, and a width of a stop band on the ultraviolet side was 6 nm.

(Consideration about Example 2)

As described above, it was found out that the optical multilayer presented in Table 2 satisfies the spectral characteristics explained while referring to FIG. 2.

Example 3

TABLE 3

| Layer number | Layer material | Layer thickness d [nm] | Coefficient value |
|---|---|---|---|
| 1 | TiO$_2$ | 101.33 | 2.0022808 |
| 2 | SiO$_2$ | 44.33 | 0.5248672 |
| 3 | TiO$_2$ | 14.95 | 0.2954120 |

TABLE 3-continued

| Layer number | Layer material | Layer thickness d [nm] | Coefficient value |
|---|---|---|---|
| 4 | SiO$_2$ | 26.63 | 0.3152992 |
| 5 | TiO$_2$ | 101.33 | 2.0022808 |
| 6 | SiO$_2$ | 44.33 | 0.5248672 |
| 7 | TiO$_2$ | 14.95 | 0.2954120 |
| 8 | SiO$_2$ | 26.63 | 0.3152992 |
| 9 | TiO$_2$ | 101.33 | 2.0022808 |
| 10 | SiO$_2$ | 44.33 | 0.5248672 |
| 11 | TiO$_2$ | 14.95 | 0.2954120 |
| 12 | SiO$_2$ | 26.63 | 0.3152992 |
| 13 | TiO$_2$ | 101.33 | 2.0022808 |
| 14 | SiO$_2$ | 44.33 | 0.5248672 |
| 15 | TiO$_2$ | 14.95 | 0.2954120 |
| 16 | SiO$_2$ | 26.63 | 0.3152992 |
| 17 | TiO$_2$ | 101.33 | 2.0022808 |
| 18 | SiO$_2$ | 44.33 | 0.5248672 |
| 19 | TiO$_2$ | 14.95 | 0.2954120 |
| 20 | SiO$_2$ | 26.63 | 0.3152992 |
| 21 | TiO$_2$ | 101.33 | 2.0022808 |
| 22 | SiO$_2$ | 44.33 | 0.5248672 |
| 23 | TiO$_2$ | 14.95 | 0.2954120 |
| 24 | SiO$_2$ | 26.63 | 0.3152992 |
| 25 | TiO$_2$ | 101.33 | 2.0022808 |
| 26 | SiO$_2$ | 44.33 | 0.5248672 |
| 27 | TiO$_2$ | 14.95 | 0.2954120 |
| 28 | SiO$_2$ | 26.63 | 0.3152992 |
| 29 | TiO$_2$ | 101.33 | 2.0022808 |
| 30 | SiO$_2$ | 44.33 | 0.5248672 |
| 31 | TiO$_2$ | 14.95 | 0.2954120 |
| 32 | SiO$_2$ | 26.63 | 0.3152992 |
| 33 | TiO$_2$ | 101.33 | 2.0022808 |
| 34 | SiO$_2$ | 44.33 | 0.5248672 |
| 35 | TiO$_2$ | 14.95 | 0.2954120 |
| 36 | SiO$_2$ | 26.63 | 0.3152992 |
| 37 | TiO$_2$ | 101.33 | 2.0022808 |
| 38 | SiO$_2$ | 44.33 | 0.5248672 |
| 39 | TiO$_2$ | 14.95 | 0.2954120 |
| 40 | SiO$_2$ | 26.63 | 0.3152992 |
| 41 | TiO$_2$ | 101.33 | 2.0022808 |
| 42 | SiO$_2$ | 44.33 | 0.5248672 |
| 43 | TiO$_2$ | 14.95 | 0.2954120 |
| 44 | SiO$_2$ | 26.63 | 0.3152992 |
| 45 | TiO$_2$ | 101.33 | 2.0022808 |
| 46 | SiO$_2$ | 44.33 | 0.5248672 |
| 47 | TiO$_2$ | 14.95 | 0.2954120 |
| 48 | SiO$_2$ | 26.63 | 0.3152992 |
| 49 | TiO$_2$ | 101.33 | 2.0022808 |
| 50 | SiO$_2$ | 44.33 | 0.5248672 |
| 51 | TiO$_2$ | 14.95 | 0.2954120 |
| 52 | SiO$_2$ | 26.63 | 0.3152992 |
| 53 | TiO$_2$ | 101.33 | 2.0022808 |
| 54 | SiO$_2$ | 44.33 | 0.5248672 |
| 55 | TiO$_2$ | 14.95 | 0.2954120 |
| 56 | SiO$_2$ | 26.63 | 0.3152992 |

As presented in Table 3, the optical multilayer in the example 3 has a structure in which the base units (a$_n$Q$_H$, b$_n$Q$_L$, c$_n$Q$_H$, d$_n$Q$_L$) are repeatedly stacked. 56 layers are stacked to form the layer. Further, the coefficients a$_n$, b$_n$, c$_n$, and d$_n$, and the average values A to D satisfy the following expressions.

A=2.000

B=0.526

C=0.295

D=0.316

(B+C+D)/3=0.379

Average(max(b$_n$/d$_n$,d$_n$/b$_n$)=1.665

As described above, it can be understood that the coefficients $a_n$ to $d_n$, and the average values A to D of the optical multilayer of the example 3 satisfy the aforementioned expression (5) to expression (8).

Figure 8:
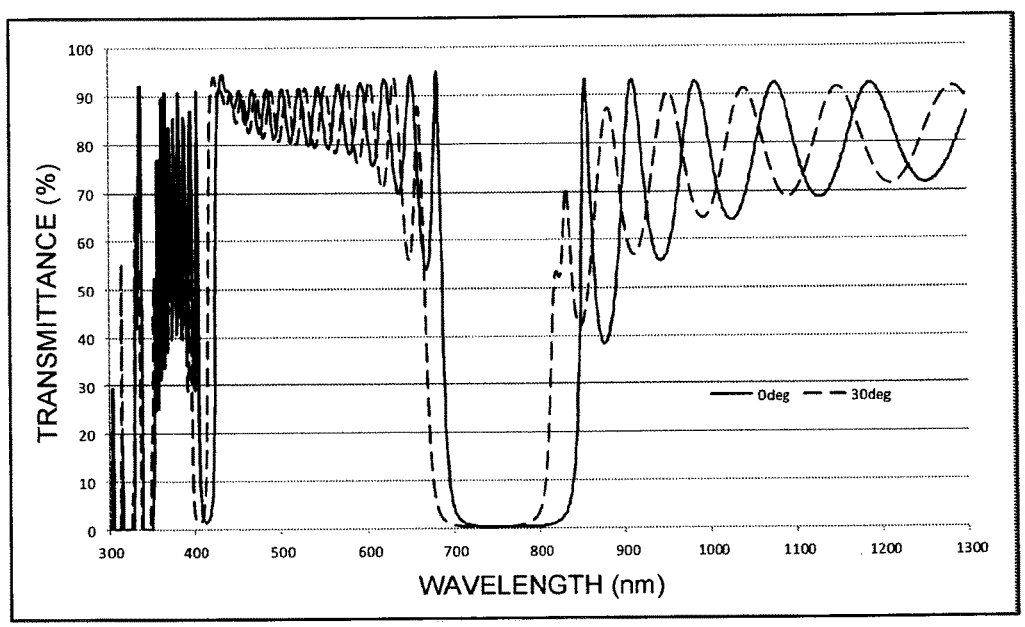
FIG. 8 illustrates simulation results of a near-infrared cut filter according to an example 3.

FIG. 8 illustrates simulation results of spectral characteristics of the optical multilayer presented in Table 3. In FIG. 8, a vertical axis indicates a transmittance, and a horizontal axis indicates a wavelength. FIG. 8 illustrates simulation results under the 0° incident condition and the 30° incident condition. As a result of the simulation, in the layer configuration presented in Table 1, a shift amount at a half-wavelength position between the case of the 0° incident condition and the case of the 30° incident condition on the near-infrared (IR) side was 19.8 nm, and that on the ultraviolet (UV) side was 8.7 nm Further, a difference between a half-value wavelength on the ultraviolet side and a half-value wavelength on the near-infrared side of a transmission band under the 0° incident condition was 262 nm. A range of the transmission band was from 434 nm to 682 nm. Further, the half-value wavelength on the near-infrared side was 687 nm, and the half-value wavelength on the ultraviolet side was 425 nm. A width of a stop band on the near-infrared side was 136 nm, and a width of a stop band on the ultraviolet side was 13 nm.

(Consideration about Example 3)

As described above, it was found out that the optical multilayer presented in Table 3 satisfies the spectral characteristics explained while referring to FIG. 2.

Example 4

TABLE 4

| Layer number | Layer material | Layer thickness d [nm] | Coefficient value |
| --- | --- | --- | --- |
| 1 | TiO$_2$ | 86.13 | 1.7019288 |
| 2 | SiO$_2$ | 36.75 | 0.4351200 |
| 3 | TiO$_2$ | 25.08 | 0.4955808 |
| 4 | SiO$_2$ | 36.75 | 0.4351200 |
| 5 | TiO$_2$ | 86.13 | 1.7019288 |
| 6 | SiO$_2$ | 36.75 | 0.4351200 |
| 7 | TiO$_2$ | 25.08 | 0.4955808 |
| 8 | SiO$_2$ | 36.75 | 0.4351200 |
| 9 | TiO$_2$ | 86.13 | 1.7019288 |
| 10 | SiO$_2$ | 36.75 | 0.4351200 |
| 11 | TiO$_2$ | 25.08 | 0.4955808 |
| 12 | SiO$_2$ | 36.75 | 0.4351200 |
| 13 | TiO$_2$ | 86.13 | 1.7019288 |
| 14 | SiO$_2$ | 36.75 | 0.4351200 |
| 15 | TiO$_2$ | 25.08 | 0.4955808 |
| 16 | SiO$_2$ | 36.75 | 0.4351200 |
| 17 | TiO$_2$ | 86.13 | 1.7019288 |
| 18 | SiO$_2$ | 36.75 | 0.4351200 |
| 19 | TiO$_2$ | 25.08 | 0.4955808 |
| 20 | SiO$_2$ | 36.75 | 0.4351200 |
| 21 | TiO$_2$ | 86.13 | 1.7019288 |
| 22 | SiO$_2$ | 36.75 | 0.4351200 |
| 23 | TiO$_2$ | 25.08 | 0.4955808 |
| 24 | SiO$_2$ | 36.75 | 0.4351200 |
| 25 | TiO$_2$ | 86.13 | 1.7019288 |
| 26 | SiO$_2$ | 36.75 | 0.4351200 |
| 27 | TiO$_2$ | 25.08 | 0.4955808 |
| 28 | SiO$_2$ | 36.75 | 0.4351200 |
| 29 | TiO$_2$ | 86.13 | 1.7019288 |
| 30 | SiO$_2$ | 36.75 | 0.4351200 |
| 31 | TiO$_2$ | 25.08 | 0.4955808 |
| 32 | SiO$_2$ | 36.75 | 0.4351200 |
| 33 | TiO$_2$ | 86.13 | 1.7019288 |
| 34 | SiO$_2$ | 36.75 | 0.4351200 |
| 35 | TiO$_2$ | 25.08 | 0.4955808 |
| 36 | SiO$_2$ | 36.75 | 0.4351200 |
| 37 | TiO$_2$ | 86.13 | 1.7019288 |
| 38 | SiO$_2$ | 36.75 | 0.4351200 |
| 39 | TiO$_2$ | 25.08 | 0.4955808 |
| 40 | SiO$_2$ | 36.75 | 0.4351200 |
| 41 | TiO$_2$ | 86.13 | 1.7019288 |
| 42 | SiO$_2$ | 36.75 | 0.4351200 |
| 43 | TiO$_2$ | 25.08 | 0.4955808 |
| 44 | SiO$_2$ | 36.75 | 0.4351200 |
| 45 | TiO$_2$ | 86.13 | 1.7019288 |
| 46 | SiO$_2$ | 36.75 | 0.4351200 |
| 47 | TiO$_2$ | 25.08 | 0.4955808 |
| 48 | SiO$_2$ | 36.75 | 0.4351200 |
| 49 | TiO$_2$ | 86.13 | 1.7019288 |
| 50 | SiO$_2$ | 36.75 | 0.4351200 |
| 51 | TiO$_2$ | 25.08 | 0.4955808 |
| 52 | SiO$_2$ | 36.75 | 0.4351200 |
| 53 | TiO$_2$ | 86.13 | 1.7019288 |
| 54 | SiO$_2$ | 36.75 | 0.4351200 |
| 55 | TiO$_2$ | 25.08 | 0.4955808 |
| 56 | SiO$_2$ | 36.75 | 0.4351200 |

As presented in Table 4, the optical multilayer in the example 4 has a structure in which the base units ($a_n Q_H$, $b_n Q_L$, $c_n Q_H$, $d_n Q_L$) are repeatedly stacked. 56 layers are stacked to form the layer. Further, the coefficients $a_n$, $b_n$, $c_n$, and $d_n$, and the average values A to D satisfy the following expressions.

A=1.700

B=0.436

C=0.495

D=0.436

(B+C+D)/3=0.456

Average(max($b_n/d_n$, $d_n/b_n$))=1.000

As described above, it can be understood that the coefficients $a_n$ to $d_n$, and the average values A to D of the optical multilayer of the example 4 satisfy the aforementioned expression (5) to expression (7).

Figure 9:
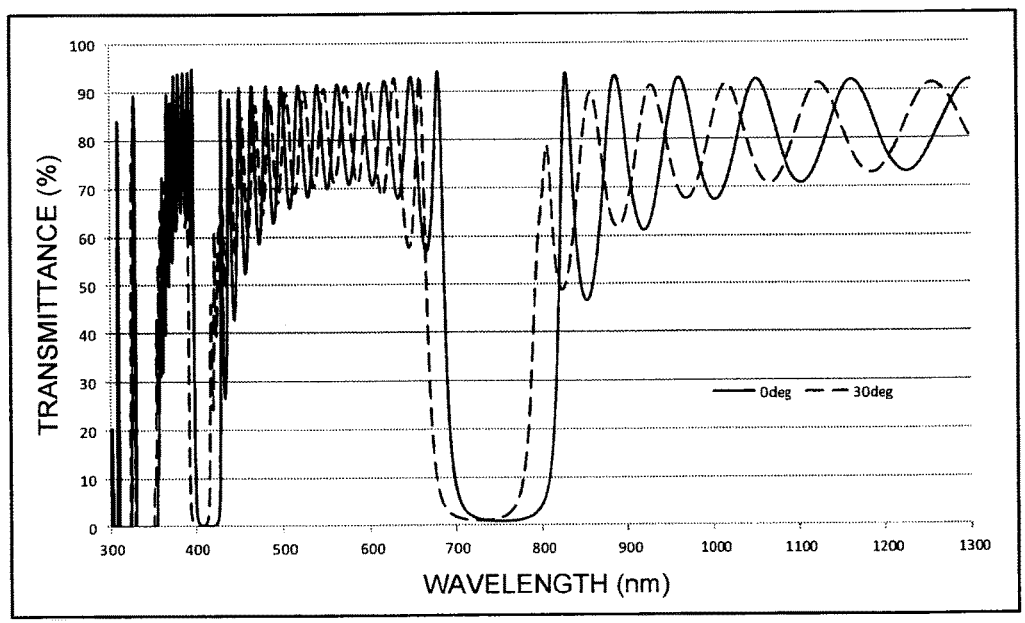
FIG. 9 illustrates simulation results of a near-infrared cut filter according to an example 4.

FIG. 9 illustrates simulation results of spectral characteristics of the optical multilayer presented in Table 4. In FIG. 9, a vertical axis indicates a transmittance, and a horizontal axis indicates a wavelength. FIG. 9 illustrates simulation results under the 0° incident condition and the 30° incident condition. As a result of the simulation, in the layer configuration presented in Table 1, a shift amount at a half-wavelength position between the case of the 0° incident condition and the case of the 30° incident condition on the near-infrared (IR) side was 20.9 nm, and that on the ultraviolet (UV) side was 11.6 nm. Note that regarding the ultraviolet (UV) side, a shift amount at T40% (transmittance of 40%) is described due to the generation of ripple.

Further, a difference between a half-value wavelength on the ultraviolet side and a half-value wavelength on the near-infrared side of a transmission band under the 0° incident condition was 258 nm. A range of the transmission band was from 430 nm to 680 nm. Further, the half-value wavelength on the near-infrared side was 687 nm, and the half-value wavelength on the ultraviolet side was 429 nm. A width of a stop band on the near-infrared side was 97 nm, and a width of a stop band on the ultraviolet side was 27 nm.

(Consideration about Example 4)

As described above, it was found out that the optical multilayer presented in Table 4 satisfies the spectral characteristics explained while referring to FIG. 2.

Examples 5 to 8

Next, examples 5 to 8 will be described. In each of the examples 5 to 8, niobium oxide ($Nb_2O_5$) was used as the material of the high-refractive index layer, and silicon oxide ($SiO_2$) was used as the material of the low-refractive index layer. Note that spectral characteristics were simulated by setting a refractive index of niobium oxide ($Nb_2O_5$) at the wavelength of 500 nm to 2.38, and setting a refractive index of silicon oxide ($SiO_2$) at the wavelength of 500 nm to 1.48. Hereinafter, layer conditions and simulation results in the examples 5 to 8 are presented in the following Tables 5 to 8, and FIG. 10 to FIG. 13, respectively. Note that a "layer thickness" in Tables 5 to 8 indicates a physical layer thickness. Further, a "coefficient value" is a coefficient indicating that the physical layer thickness corresponds to a product as a result of multiplying the QWOT by what number.

Example 5

TABLE 5

| Layer number | Layer material | Layer thickness d [nm] | Coefficient value |
|---|---|---|---|
| 1 | $Nb_2O_5$ | 107.71 | 2.0507984 |
| 2 | $SiO_2$ | 102.78 | 1.2169152 |
| 3 | $Nb_2O_5$ | 13.12 | 0.2498048 |
| 4 | $SiO_2$ | 36.63 | 0.4336992 |
| 5 | $Nb_2O_5$ | 65.80 | 1.2528320 |
| 6 | $SiO_2$ | 58.84 | 0.6966656 |
| 7 | $Nb_2O_5$ | 15.93 | 0.3033072 |
| 8 | $SiO_2$ | 54.56 | 0.6459904 |
| 9 | $Nb_2O_5$ | 80.34 | 1.5296736 |
| 10 | $SiO_2$ | 37.32 | 0.4418688 |
| 11 | $Nb_2O_5$ | 22.56 | 0.4295424 |
| 12 | $SiO_2$ | 47.22 | 0.5590848 |
| 13 | $Nb_2O_5$ | 87.61 | 1.6680944 |
| 14 | $SiO_2$ | 31.75 | 0.3759200 |
| 15 | $Nb_2O_5$ | 24.07 | 0.4582928 |
| 16 | $SiO_2$ | 42.92 | 0.5081728 |
| 17 | $Nb_2O_5$ | 90.77 | 1.7282608 |
| 18 | $SiO_2$ | 29.92 | 0.3542528 |
| 19 | $Nb_2O_5$ | 24.67 | 0.4697168 |
| 20 | $SiO_2$ | 39.90 | 0.4724160 |
| 21 | $Nb_2O_5$ | 92.29 | 1.7572016 |
| 22 | $SiO_2$ | 29.39 | 0.3479776 |
| 23 | $Nb_2O_5$ | 24.95 | 0.4750480 |
| 24 | $SiO_2$ | 37.65 | 0.4457760 |
| 25 | $Nb_2O_5$ | 93.24 | 1.7752896 |
| 26 | $SiO_2$ | 29.34 | 0.3473856 |
| 27 | $Nb_2O_5$ | 25.06 | 0.4771424 |
| 28 | $SiO_2$ | 35.93 | 0.4254112 |
| 29 | $Nb_2O_5$ | 94.11 | 1.7918544 |
| 30 | $SiO_2$ | 29.25 | 0.3463200 |
| 31 | $Nb_2O_5$ | 25.01 | 0.4761904 |
| 32 | $SiO_2$ | 34.50 | 0.4084800 |
| 33 | $Nb_2O_5$ | 95.10 | 1.8107040 |
| 34 | $SiO_2$ | 28.99 | 0.3432416 |
| 35 | $Nb_2O_5$ | 24.66 | 0.4695264 |
| 36 | $SiO_2$ | 33.64 | 0.3982976 |
| 37 | $Nb_2O_5$ | 96.53 | 1.8379312 |
| 38 | $SiO_2$ | 28.64 | 0.3390976 |
| 39 | $Nb_2O_5$ | 23.78 | 0.4527712 |
| 40 | $SiO_2$ | 33.63 | 0.3981792 |
| 41 | $Nb_2O_5$ | 98.78 | 1.8807712 |
| 42 | $SiO_2$ | 28.84 | 0.3414656 |

TABLE 5-continued

| Layer number | Layer material | Layer thickness d [nm] | Coefficient value |
|---|---|---|---|
| 43 | $Nb_2O_5$ | 22.07 | 0.4202128 |
| 44 | $SiO_2$ | 35.21 | 0.4168864 |
| 45 | $Nb_2O_5$ | 103.46 | 1.9698784 |
| 46 | $SiO_2$ | 31.23 | 0.3697632 |
| 47 | $Nb_2O_5$ | 20.14 | 0.3834656 |
| 48 | $SiO_2$ | 36.16 | 0.4281344 |
| 49 | $Nb_2O_5$ | 111.97 | 2.1319088 |
| 50 | $SiO_2$ | 32.90 | 0.3895360 |
| 51 | $Nb_2O_5$ | 23.78 | 0.4527712 |
| 52 | $SiO_2$ | 22.10 | 0.2616640 |
| 53 | $Nb_2O_5$ | 91.30 | 1.7383520 |
| 54 | $SiO_2$ | 80.21 | 0.9496864 |

As presented in Table 5, the optical multilayer in the example 5 has a structure in which the base units ($a_n Q_H$, $b_n Q_L$, $c_n Q_H$, $d_n Q_L$) are repeatedly stacked. 54 layers are stacked to form the layer. Further, the coefficients $a_n$, $b_n$, $c_n$, and $d_n$, and the average values A to D satisfy the following expressions. Note that the 53-th layer and the 54-th layer are layers for adjusting a ripple, so that the 53-th layer and the 54-th layer were excluded from the calculation of the coefficients $a_n$, $b_n$, $c_n$, and $d_n$, and the average values A to D.

$A=1.780$ $B=0.455$ $C=0.424$ $D=0.446$ $(B+C+D)/3=0.442$ $\text{Average}(\max(b_n/d_n, d_n/b_n))=1.363$ As described above, it can be understood that the coefficients $a_n$ to $d_n$, and the average values A to D of the optical multilayer of the example 5 satisfy the aforementioned expression (5) to expression (8).

Figure 10:
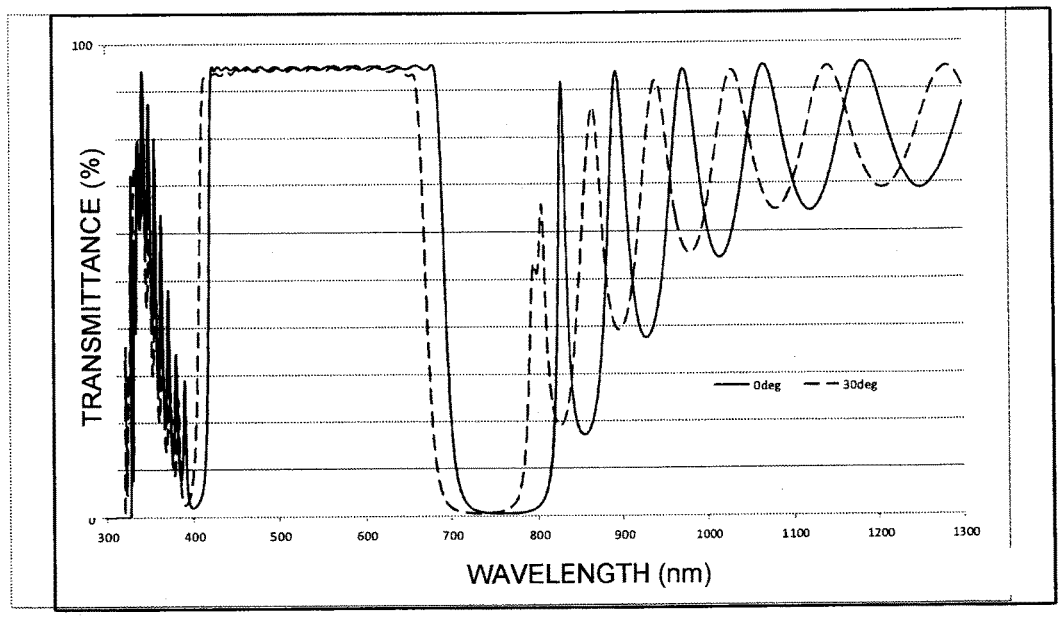
FIG. 10 illustrates simulation results of a near-infrared cut filter according to an example 5.

FIG. 10 illustrates simulation results of spectral characteristics of the optical multilayer presented in Table 5. In FIG. 10, a vertical axis indicates a transmittance, and a horizontal axis indicates a wavelength. FIG. 10 illustrates simulation results under the 0° incident condition and the 30° incident condition. As a result of the simulation, in the layer configuration presented in Table 1, a shift amount at a half-wavelength position between the case of the 0° incident condition and the case of the 30° incident condition on the near-infrared (IR) side was 21.9 nm, and that on the ultraviolet (UV) side was 11.3 nm.

Further, a difference between a half-value wavelength on the ultraviolet side and a half-value wavelength on the near-infrared side of a transmission band under the 0° incident condition was 275 nm. A range of the transmission band was from 423 nm to 681 nm. Further, the half-value wavelength on the near-infrared side was 694 nm, and the half-value wavelength on the ultraviolet side was 419 nm. A width of a stop band on the near-infrared side was 98 nm, and a width of a stop band on the ultraviolet side was 16 nm.

(Consideration about Example 5)

As described above, it was found out that the optical multilayer presented in Table 5 satisfies the spectral characteristics explained while referring to FIG. 2.

Example 6

TABLE 6

| Layer number | Layer material | Layer thickness d [nm] | Coefficient value |
|---|---|---|---|
| 1 | $Nb_2O_5$ | 96.62 | 1.8396448 |
| 2 | $SiO_2$ | 49.39 | 0.5847776 |
| 3 | $Nb_2O_5$ | 18.13 | 0.3451952 |
| 4 | $SiO_2$ | 27.48 | 0.3253632 |
| 5 | $Nb_2O_5$ | 96.62 | 1.8396448 |
| 6 | $SiO_2$ | 49.39 | 0.5847776 |
| 7 | $Nb_2O_5$ | 18.13 | 0.3451952 |
| 8 | $SiO_2$ | 27.48 | 0.3253632 |
| 9 | $Nb_2O_5$ | 96.62 | 1.8396448 |
| 10 | $SiO_2$ | 49.39 | 0.5847776 |
| 11 | $Nb_2O_5$ | 18.13 | 0.3451952 |
| 12 | $SiO_2$ | 27.48 | 0.3253632 |
| 13 | $Nb_2O_5$ | 96.62 | 1.8396448 |
| 14 | $SiO_2$ | 49.39 | 0.5847776 |
| 15 | $Nb_2O_5$ | 18.13 | 0.3451952 |
| 16 | $SiO_2$ | 27.48 | 0.3253632 |
| 17 | $Nb_2O_5$ | 96.62 | 1.8396448 |
| 18 | $SiO_2$ | 49.39 | 0.5847776 |
| 19 | $Nb_2O_5$ | 18.13 | 0.3451952 |
| 20 | $SiO_2$ | 27.48 | 0.3253632 |
| 21 | $Nb_2O_5$ | 96.62 | 1.8396448 |
| 22 | $SiO_2$ | 49.39 | 0.5847776 |
| 23 | $Nb_2O_5$ | 18.13 | 0.3451952 |
| 24 | $SiO_2$ | 27.48 | 0.3253632 |
| 25 | $Nb_2O_5$ | 96.62 | 1.8396448 |
| 26 | $SiO_2$ | 49.39 | 0.5847776 |
| 27 | $Nb_2O_5$ | 18.13 | 0.3451952 |
| 28 | $SiO_2$ | 27.48 | 0.3253632 |
| 29 | $Nb_2O_5$ | 96.62 | 1.8396448 |
| 30 | $SiO_2$ | 49.39 | 0.5847776 |
| 31 | $Nb_2O_5$ | 18.13 | 0.3451952 |
| 32 | $SiO_2$ | 27.48 | 0.3253632 |
| 33 | $Nb_2O_5$ | 96.62 | 1.8396448 |
| 34 | $SiO_2$ | 49.39 | 0.5847776 |
| 35 | $Nb_2O_5$ | 18.13 | 0.3451952 |
| 36 | $SiO_2$ | 27.48 | 0.3253632 |
| 37 | $Nb_2O_5$ | 96.62 | 1.8396448 |
| 38 | $SiO_2$ | 49.39 | 0.5847776 |
| 39 | $Nb_2O_5$ | 18.13 | 0.3451952 |
| 40 | $SiO_2$ | 27.48 | 0.3253632 |
| 41 | $Nb_2O_5$ | 96.62 | 1.8396448 |
| 42 | $SiO_2$ | 49.39 | 0.5847776 |
| 43 | $Nb_2O_5$ | 18.13 | 0.3451952 |
| 44 | $SiO_2$ | 27.48 | 0.3253632 |
| 45 | $Nb_2O_5$ | 96.62 | 1.8396448 |
| 46 | $SiO_2$ | 49.39 | 0.5847776 |
| 47 | $Nb_2O_5$ | 18.13 | 0.3451952 |
| 48 | $SiO_2$ | 27.48 | 0.3253632 |
| 49 | $Nb_2O_5$ | 96.62 | 1.8396448 |
| 50 | $SiO_2$ | 49.39 | 0.5847776 |
| 51 | $Nb_2O_5$ | 18.13 | 0.3451952 |
| 52 | $SiO_2$ | 27.48 | 0.3253632 |
| 53 | $Nb_2O_5$ | 96.62 | 1.8396448 |
| 54 | $SiO_2$ | 49.39 | 0.5847776 |
| 55 | $Nb_2O_5$ | 18.13 | 0.3451952 |
| 56 | $SiO_2$ | 27.48 | 0.3253632 |

As presented in Table 6, the optical multilayer in the example 6 has a structure in which the base units ($a_nQ_H$, $b_nQ_L$, $c_nQ_H$, $d_nQ_L$) are repeatedly stacked. 56 layers are stacked to form the layer. Further, the coefficients $a_n$, $b_n$, $c_n$, and $d_n$, and the average values A to D satisfy the following expressions.

A=1.839

B=0.586

C=0.345

D=0.326

(B+C+D)/3=0.419

Average(max($b_n/d_n,d_n/b_n$))=1.797

As described above, it can be understood that the coefficients $a_n$ to $d_n$, and the average values A to D of the optical multilayer of the example 6 satisfy the aforementioned expression (5) to expression (8).

Figure 11:
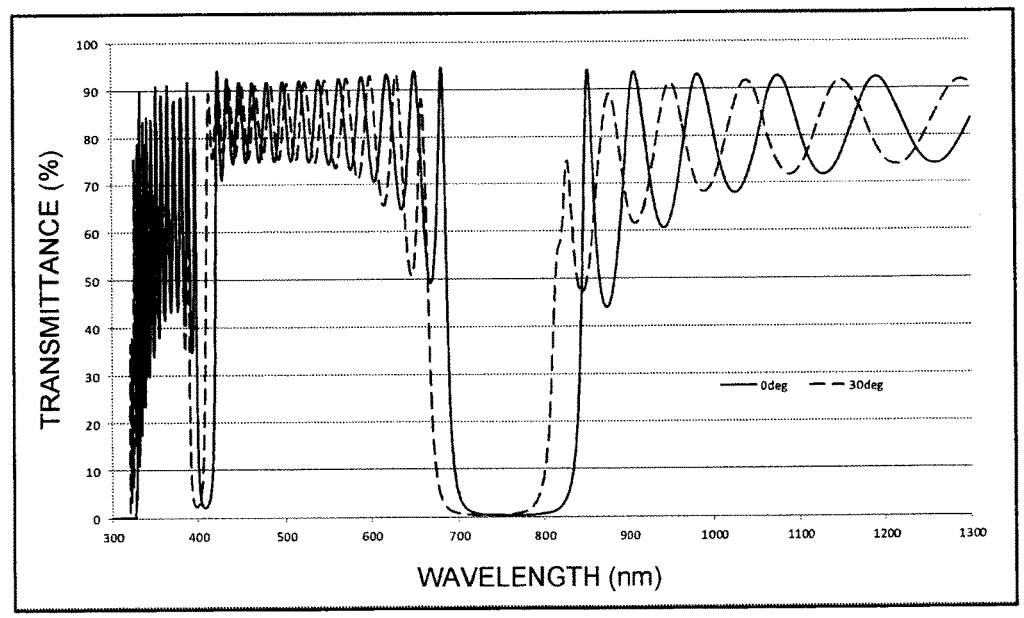
FIG. 11 illustrates simulation results of a near-infrared cut filter according to an example 6.

FIG. 11 illustrates simulation results of spectral characteristics of the optical multilayer presented in Table 6. In FIG. 11, a vertical axis indicates a transmittance, and a horizontal axis indicates a wavelength. FIG. 11 illustrates simulation results under the 0° incident condition and the 30° incident condition. As a result of the simulation, in the layer configuration presented in Table 1, a shift amount at a half-wavelength position between the case of the 0° incident condition and the case of the 30° incident condition on the near-infrared (IR) side was 21.7 nm, and that on the ultraviolet (UV) side was 10.7 nm.

Further, a difference between a half-value wavelength on the ultraviolet side and a half-value wavelength on the near-infrared side of a transmission band under the 0° incident condition was 266 nm. A range of the transmission band was from 424 nm to 682 nm. Further, the half-value wavelength on the near-infrared side was 687 nm, and the half-value wavelength on the ultraviolet side was 421 nm. A width of a stop band on the near-infrared side was 130 nm, and a width of a stop band on the ultraviolet side was 12 nm.

(Consideration about Example 6)

As described above, it was found out that the optical multilayer presented in Table 6 satisfies the spectral characteristics explained while referring to FIG. 2.

Example 7

TABLE 7

| Layer number | Layer material | Layer thickness d [nm] | Coefficient value |
|---|---|---|---|
| 1 | $Nb_2O_5$ | 105.08 | 2.0007232 |
| 2 | $SiO_2$ | 48.55 | 0.5748320 |
| 3 | $Nb_2O_5$ | 16.02 | 0.3050208 |
| 4 | $SiO_2$ | 19.05 | 0.2255520 |
| 5 | $Nb_2O_5$ | 105.08 | 2.0007232 |
| 6 | $SiO_2$ | 48.55 | 0.5748320 |
| 7 | $Nb_2O_5$ | 16.02 | 0.3050208 |
| 8 | $SiO_2$ | 19.05 | 0.2255520 |
| 9 | $Nb_2O_5$ | 105.08 | 2.0007232 |
| 10 | $SiO_2$ | 48.55 | 0.5748320 |
| 11 | $Nb_2O_5$ | 16.02 | 0.3050208 |
| 12 | $SiO_2$ | 19.05 | 0.2255520 |
| 13 | $Nb_2O_5$ | 105.08 | 2.0007232 |
| 14 | $SiO_2$ | 48.55 | 0.5748320 |
| 15 | $Nb_2O_5$ | 16.02 | 0.3050208 |
| 16 | $SiO_2$ | 19.05 | 0.2255520 |
| 17 | $Nb_2O_5$ | 105.08 | 2.0007232 |
| 18 | $SiO_2$ | 48.55 | 0.5748320 |
| 19 | $Nb_2O_5$ | 16.02 | 0.3050208 |
| 20 | $SiO_2$ | 19.05 | 0.2255520 |
| 21 | $Nb_2O_5$ | 105.08 | 2.0007232 |
| 22 | $SiO_2$ | 48.55 | 0.5748320 |
| 23 | $Nb_2O_5$ | 16.02 | 0.3050208 |
| 24 | $SiO_2$ | 19.05 | 0.2255520 |
| 25 | $Nb_2O_5$ | 105.08 | 2.0007232 |
| 26 | $SiO_2$ | 48.55 | 0.5748320 |
| 27 | $Nb_2O_5$ | 16.02 | 0.3050208 |
| 28 | $SiO_2$ | 19.05 | 0.2255520 |
| 29 | $Nb_2O_5$ | 105.08 | 2.0007232 |
| 30 | $SiO_2$ | 48.55 | 0.5748320 |
| 31 | $Nb_2O_5$ | 16.02 | 0.3050208 |
| 32 | $SiO_2$ | 19.05 | 0.2255520 |

TABLE 7-continued

| Layer number | Layer material | Layer thickness d [nm] | Coefficient value |
|---|---|---|---|
| 33 | Nb$_2$O$_5$ | 105.08 | 2.0007232 |
| 34 | SiO$_2$ | 48.55 | 0.5748320 |
| 35 | Nb$_2$O$_5$ | 16.02 | 0.3050208 |
| 36 | SiO$_2$ | 19.05 | 0.2255520 |
| 37 | Nb$_2$O$_5$ | 105.08 | 2.0007232 |
| 38 | SiO$_2$ | 48.55 | 0.5748320 |
| 39 | Nb$_2$O$_5$ | 16.02 | 0.3050208 |
| 40 | SiO$_2$ | 19.05 | 0.2255520 |
| 41 | Nb$_2$O$_5$ | 105.08 | 2.0007232 |
| 42 | SiO$_2$ | 48.55 | 0.5748320 |
| 43 | Nb$_2$O$_5$ | 16.02 | 0.3050208 |
| 44 | SiO$_2$ | 19.05 | 0.2255520 |
| 45 | Nb$_2$O$_5$ | 105.08 | 2.0007232 |
| 46 | SiO$_2$ | 48.55 | 0.5748320 |
| 47 | Nb$_2$O$_5$ | 16.02 | 0.3050208 |
| 48 | SiO$_2$ | 19.05 | 0.2255520 |
| 49 | Nb$_2$O$_5$ | 105.08 | 2.0007232 |
| 50 | SiO$_2$ | 48.55 | 0.5748320 |
| 51 | Nb$_2$O$_5$ | 16.02 | 0.3050208 |
| 52 | SiO$_2$ | 19.05 | 0.2255520 |
| 53 | Nb$_2$O$_5$ | 105.08 | 2.0007232 |
| 54 | SiO$_2$ | 48.55 | 0.5748320 |
| 55 | Nb$_2$O$_5$ | 16.02 | 0.3050208 |
| 56 | SiO$_2$ | 19.05 | 0.2255520 |

As presented in Table 7, the optical multilayer in the example 7 has a structure in which the base units ($a_n Q_H$, $b_n Q_L$, $c_n Q_H$, $d_n Q_L$) are repeatedly stacked. 56 layers are stacked to form the layer. Further, the coefficients $a_n$, $b_n$, $c_n$, and $d_n$, and the average values A to D satisfy the following expressions.

$$A=2.000$$

$$B=0.567$$

$$C=0.305$$

$$D=0.226$$

$$(B+C+D)/3=0.369$$

$$\text{Average}(\max(b_n/d_n, d_n/b_n))=2.549$$

As described above, it can be understood that the coefficients $a_n$ to $d_n$, and the average values A to D of the optical multilayer of the example 7 satisfy the aforementioned expression (5) to expression (7).

Figure 12:
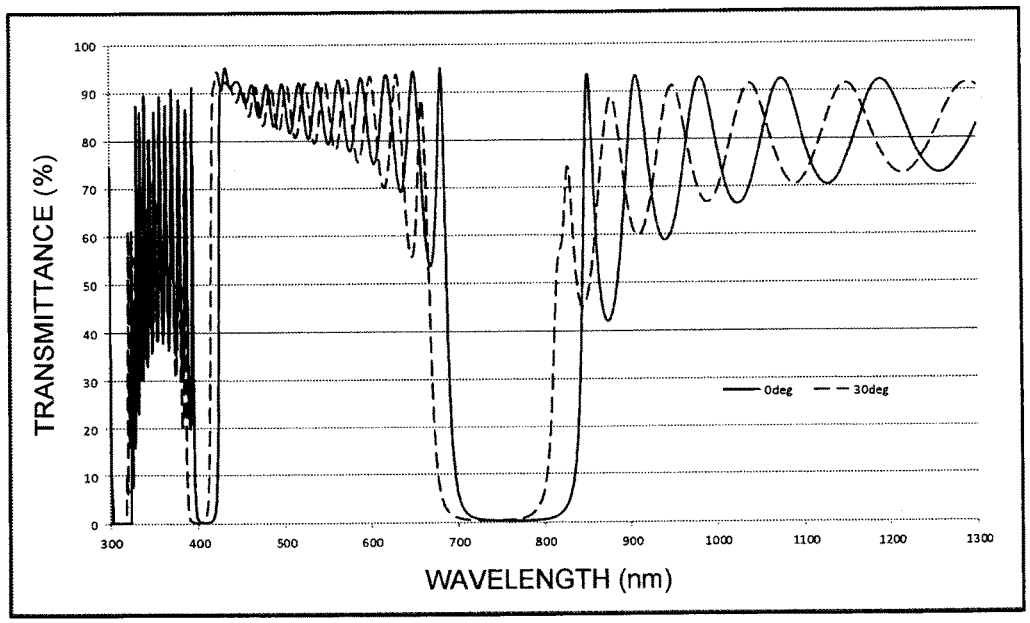
FIG. 12 illustrates simulation results of a near-infrared cut filter according to an example 7.

FIG. 12 illustrates simulation results of spectral characteristics of the optical multilayer presented in Table 7. In FIG. 12, a vertical axis indicates a transmittance, and a horizontal axis indicates a wavelength. FIG. 12 illustrates simulation results under the 0° incident condition and the 30° incident condition. As a result of the simulation, in the layer configuration presented in Table 1, a shift amount at a half-wavelength position between the case of the 0° incident condition and the case of the 30° incident condition on the near-infrared (IR) side was 20.6 nm, and that on the ultraviolet (UV) side was 9.6 nm.

Further, a difference between a half-value wavelength on the ultraviolet side and a half-value wavelength on the near-infrared side of a transmission band under the 0° incident condition was 264 nm. A range of the transmission band was from 433 nm to 683 nm. Further, the half-value wavelength on the near-infrared side was 688 nm, and the half-value wavelength on the ultraviolet side was 425 nm. A width of a stop band on the near-infrared side was 129 nm, and a width of a stop band on the ultraviolet side was 24 nm.

(Consideration about Example 7)

As described above, it was found out that the optical multilayer presented in Table 7 satisfies the spectral characteristics explained while referring to FIG. 2.

Example 8

TABLE 8

| Layer number | Layer material | Layer thickness d [nm] | Coefficient value |
|---|---|---|---|
| 1 | Nb$_2$O$_5$ | 89.32 | 1.7006528 |
| 2 | SiO$_2$ | 51.07 | 0.6046688 |
| 3 | Nb$_2$O$_5$ | 20.23 | 0.3851792 |
| 4 | SiO$_2$ | 34.22 | 0.4051648 |
| 5 | Nb$_2$O$_5$ | 89.32 | 1.7006528 |
| 6 | SiO$_2$ | 51.07 | 0.6046688 |
| 7 | Nb$_2$O$_5$ | 20.23 | 0.3851792 |
| 8 | SiO$_2$ | 34.22 | 0.4051648 |
| 9 | Nb$_2$O$_5$ | 89.32 | 1.7006528 |
| 10 | SiO$_2$ | 51.07 | 0.6046688 |
| 11 | Nb$_2$O$_5$ | 20.23 | 0.3851792 |
| 12 | SiO$_2$ | 34.22 | 0.4051648 |
| 13 | Nb$_2$O$_5$ | 89.32 | 1.7006528 |
| 14 | SiO$_2$ | 51.07 | 0.6046688 |
| 15 | Nb$_2$O$_5$ | 20.23 | 0.3851792 |
| 16 | SiO$_2$ | 34.22 | 0.4051648 |
| 17 | Nb$_2$O$_5$ | 89.32 | 1.7006528 |
| 18 | SiO$_2$ | 51.07 | 0.6046688 |
| 19 | Nb$_2$O$_5$ | 20.23 | 0.3851792 |
| 20 | SiO$_2$ | 34.22 | 0.4051648 |
| 21 | Nb$_2$O$_5$ | 89.32 | 1.7006528 |
| 22 | SiO$_2$ | 51.07 | 0.6046688 |
| 23 | Nb$_2$O$_5$ | 20.23 | 0.3851792 |
| 24 | SiO$_2$ | 34.22 | 0.4051648 |
| 25 | Nb$_2$O$_5$ | 89.32 | 1.7006528 |
| 26 | SiO$_2$ | 51.07 | 0.6046688 |
| 27 | Nb$_2$O$_5$ | 20.23 | 0.3851792 |
| 28 | SiO$_2$ | 34.22 | 0.4051648 |
| 29 | Nb$_2$O$_5$ | 89.32 | 1.7006528 |
| 30 | SiO$_2$ | 51.07 | 0.6046688 |
| 31 | Nb$_2$O$_5$ | 20.23 | 0.3851792 |
| 32 | SiO$_2$ | 34.22 | 0.4051648 |
| 33 | Nb$_2$O$_5$ | 89.32 | 1.7006528 |
| 34 | SiO$_2$ | 51.07 | 0.6046688 |
| 35 | Nb$_2$O$_5$ | 20.23 | 0.3851792 |
| 36 | SiO$_2$ | 34.22 | 0.4051648 |
| 37 | Nb$_2$O$_5$ | 89.32 | 1.7006528 |
| 38 | SiO$_2$ | 51.07 | 0.6046688 |
| 39 | Nb$_2$O$_5$ | 20.23 | 0.3851792 |
| 40 | SiO$_2$ | 34.22 | 0.4051648 |
| 41 | Nb$_2$O$_5$ | 89.32 | 1.7006528 |
| 42 | SiO$_2$ | 51.07 | 0.6046688 |
| 43 | Nb$_2$O$_5$ | 20.23 | 0.3851792 |
| 44 | SiO$_2$ | 34.22 | 0.4051648 |
| 45 | Nb$_2$O$_5$ | 89.32 | 1.7006528 |
| 46 | SiO$_2$ | 51.07 | 0.6046688 |
| 47 | Nb$_2$O$_5$ | 20.23 | 0.3851792 |
| 48 | SiO$_2$ | 34.22 | 0.4051648 |
| 49 | Nb$_2$O$_5$ | 89.32 | 1.7006528 |
| 50 | SiO$_2$ | 51.07 | 0.6046688 |
| 51 | Nb$_2$O$_5$ | 20.23 | 0.3851792 |
| 52 | SiO$_2$ | 34.22 | 0.4051648 |
| 53 | Nb$_2$O$_5$ | 89.32 | 1.7006528 |
| 54 | SiO$_2$ | 51.07 | 0.6046688 |
| 55 | Nb$_2$O$_5$ | 20.23 | 0.3851792 |
| 56 | SiO$_2$ | 34.22 | 0.4051648 |

As presented in Table 8, the optical multilayer in the example 8 has a structure in which the base units ($a_n Q_H$, $b_n Q_L$, $c_n Q_H$, $d_n Q_L$) are repeatedly stacked. 56 layers are stacked to form the layer. Further, the coefficients $a_n$, $b_n$, $c_n$, and $d_n$, and the average values A to D satisfy the following expressions.

$$A = 1.700$$

$$B = 0.606$$

$$C = 0.385$$

$$D = 0.406$$

$$(B+C+D)/3 = 0.466$$

$$\text{Average}(\max(b_n/d_n, d_n/b_n)) = 1.492$$

As described above, it can be understood that the coefficients $a_n$ to $d_n$, and the average values A to D of the optical multilayer of the example 8 satisfy the aforementioned expression (5) to expression (8).

Figure 13:
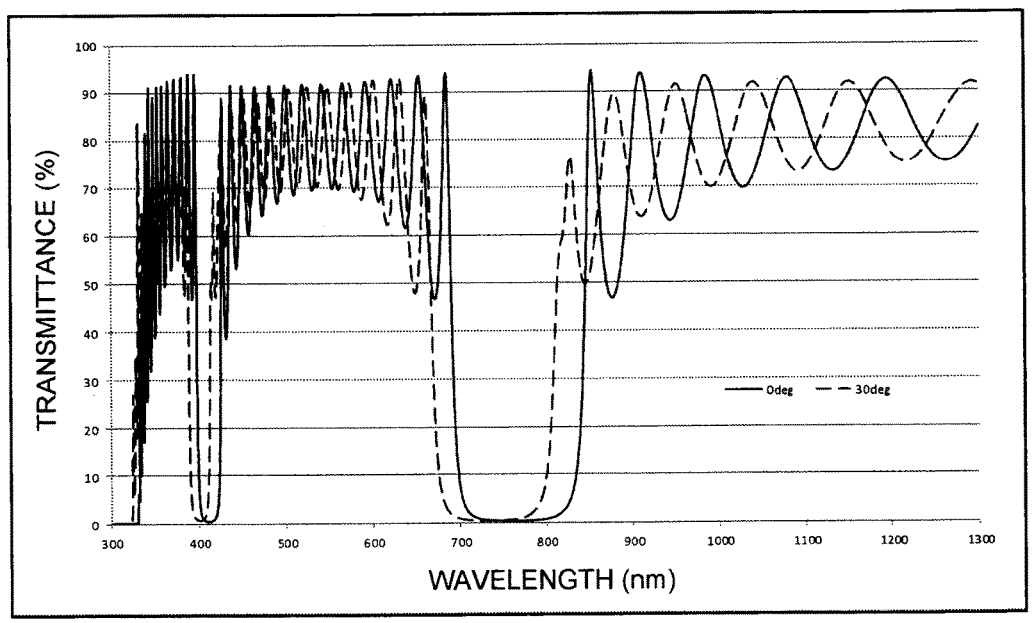
FIG. 13 illustrates simulation results of a near-infrared cut filter according to an example 8.

FIG. 13 illustrates simulation results of spectral characteristics of the optical multilayer presented in Table 8. In FIG. 13, a vertical axis indicates a transmittance, and a horizontal axis indicates a wavelength. FIG. 13 illustrates simulation results under the 0° incident condition and the 30° incident condition. As a result of the simulation, in the layer configuration presented in Table 1, a shift amount at a half-wavelength position between the case of the 0° incident condition and the case of the 30° incident condition on the near-infrared (IR) side was 22.9 nm, and that on the ultraviolet (UV) side was 12.4 nm. Note that regarding the ultraviolet (UV) side, a shift amount at T40% is described due to the generation of ripple.

Further, a difference between a half-value wavelength on the ultraviolet side and a half-value wavelength on the near-infrared side of a transmission band under the 0° incident condition was 264 nm. A range of the transmission band was from 428 nm to 686 nm. Further, the half-value wavelength on the near-infrared side was 691 nm, and the half-value wavelength on the ultraviolet side was 426 nm. A width of a stop band on the near-infrared side was 126 nm, and a width of a stop band on the ultraviolet side was 23 nm.

(Consideration about Example 8)

As described above, it was found out that the optical multilayer presented in Table 8 satisfies the spectral characteristics explained while referring to FIG. 2.

Example 9

Next, an example 9 will be described. In the example 9, tantalum oxide ($Ta_2O_5$) was used as the material of the high-refractive index layer, and silicon oxide ($SiO_2$) was used as the material of the low-refractive index layer. Note that spectral characteristics were simulated by setting a refractive index of tantalum oxide ($Ta_2O_5$) at the wavelength of 500 nm to 2.19, and setting a refractive index of silicon oxide ($SiO_2$) at the wavelength of 500 nm to 1.48. Hereinafter, layer conditions and simulation results in the example 9 are presented in the following Table 9 and FIG. 14, respectively. Note that a "layer thickness" in Table 9 indicates a physical layer thickness. Further, a "coefficient value" is a coefficient indicating that the physical layer thickness corresponds to a product as a result of multiplying the QWOT by what number.

Example 9

TABLE 9

| Layer number | Layer material | Layer thickness d [nm] | Coefficient value |
|---|---|---|---|
| 1 | $Ta_2O_5$ | 118.77 | 2.0808504 |
| 2 | $SiO_2$ | 100.96 | 1.1953664 |
| 3 | $Ta_2O_5$ | 16.89 | 0.3337464 |
| 4 | $SiO_2$ | 37.79 | 0.4474336 |
| 5 | $Ta_2O_5$ | 70.82 | 1.3994032 |
| 6 | $SiO_2$ | 45.40 | 0.5375360 |
| 7 | $Ta_2O_5$ | 31.34 | 0.6192784 |
| 8 | $SiO_2$ | 30.15 | 0.3569760 |
| 9 | $Ta_2O_5$ | 94.95 | 1.8762120 |
| 10 | $SiO_2$ | 32.14 | 0.3805376 |
| 11 | $Ta_2O_5$ | 31.34 | 0.6192784 |
| 12 | $SiO_2$ | 18.51 | 0.2191584 |
| 13 | $Ta_2O_5$ | 105.27 | 2.0801352 |
| 14 | $SiO_2$ | 35.74 | 0.4231616 |
| 15 | $Ta_2O_5$ | 21.43 | 0.4234568 |
| 16 | $SiO_2$ | 21.69 | 0.2568096 |
| 17 | $Ta_2O_5$ | 109.63 | 2.1662888 |
| 18 | $SiO_2$ | 37.23 | 0.4408032 |
| 19 | $Ta_2O_5$ | 14.18 | 0.2801968 |
| 20 | $SiO_2$ | 35.15 | 0.4161760 |
| 21 | $Ta_2O_5$ | 110.05 | 2.1745880 |
| 22 | $SiO_2$ | 35.20 | 0.4167680 |
| 23 | $Ta_2O_5$ | 10.78 | 0.2130128 |
| 24 | $SiO_2$ | 48.68 | 0.5763712 |
| 25 | $Ta_2O_5$ | 108.73 | 2.1485048 |
| 26 | $SiO_2$ | 32.19 | 0.3811296 |
| 27 | $Ta_2O_5$ | 10.14 | 0.2003664 |
| 28 | $SiO_2$ | 55.21 | 0.6536864 |
| 29 | $Ta_2O_5$ | 107.49 | 2.1240024 |
| 30 | $SiO_2$ | 30.30 | 0.3587520 |
| 31 | $Ta_2O_5$ | 11.53 | 0.2278328 |
| 32 | $SiO_2$ | 55.88 | 0.6616192 |
| 33 | $Ta_2O_5$ | 106.90 | 2.1123440 |
| 34 | $SiO_2$ | 29.16 | 0.3452544 |
| 35 | $Ta_2O_5$ | 14.41 | 0.2847416 |
| 36 | $SiO_2$ | 52.76 | 0.6246784 |
| 37 | $Ta_2O_5$ | 107.10 | 2.1162960 |
| 38 | $SiO_2$ | 27.09 | 0.3207456 |
| 39 | $Ta_2O_5$ | 18.76 | 0.3706976 |
| 40 | $SiO_2$ | 46.62 | 0.5519808 |
| 41 | $Ta_2O_5$ | 108.21 | 2.1382296 |
| 42 | $SiO_2$ | 22.34 | 0.2645056 |
| 43 | $Ta_2O_5$ | 25.12 | 0.4963712 |
| 44 | $SiO_2$ | 38.04 | 0.4503936 |
| 45 | $Ta_2O_5$ | 110.02 | 2.1739952 |
| 46 | $SiO_2$ | 13.52 | 0.1600768 |
| 47 | $Ta_2O_5$ | 34.43 | 0.6803368 |
| 48 | $SiO_2$ | 24.36 | 0.2884224 |
| 49 | $Ta_2O_5$ | 109.30 | 2.1597680 |
| 50 | $SiO_2$ | 9.52 | 0.1127168 |
| 51 | $Ta_2O_5$ | 49.31 | 0.9743656 |
| 52 | $SiO_2$ | 9.79 | 0.1159136 |
| 53 | $Ta_2O_5$ | 78.32 | 1.5476032 |
| 54 | $SiO_2$ | 87.38 | 1.0345792 |

As presented in Table 9, the optical multilayer in the example 9 has a structure in which the base units ($a_nQ_H$, $b_nQ_L$, $c_nQ_H$, $d_nQ_L$) are repeatedly stacked. 54 layers are stacked to form the layer. Further, the coefficients $a_n$, $b_n$, $c_n$, and $d_n$, and the average values A to D satisfy the following expressions. Note that the 53-th layer and the 54-th layer are layers for adjusting a ripple, so that the 53-th layer and the 54-th layer were excluded from the calculation of the coefficients $a_n$, $b_n$, $c_n$, and $d_n$, and the average values A to D.

$$A = 2.021$$

$$B = 0.411$$

$$C = 0.440$$

D=0.432

(B+C+D)/3=0.428

Average(max($b_n/d_n, d_n/b_n$)=1.664

As described above, it can be understood that the coefficients $a_n$ to $d_n$, and the average values A to D of the optical multilayer of the example 8 satisfy the aforementioned expression (5) to expression (8).

Figure 14:
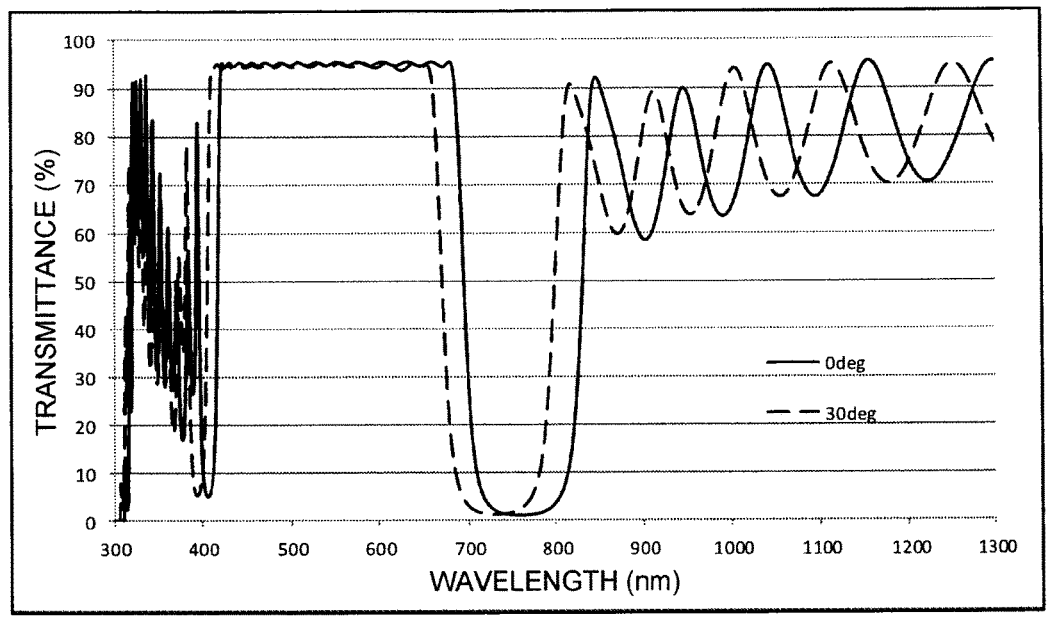
FIG. 14 illustrates simulation results of a near-infrared cut filter according to an example 9.

FIG. 14 illustrates simulation results of spectral characteristics of the optical multilayer presented in Table 9. In FIG. 14, a vertical axis indicates a transmittance, and a horizontal axis indicates a wavelength. FIG. 14 illustrates simulation results under the 0° incident condition and the 30° incident condition. As a result of the simulation, in the layer configuration presented in Table 1, a shift amount at a half-wavelength position between the case of the 0° incident condition and the case of the 30° incident condition on the near-infrared (IR) side was 24.1 nm, and that on the ultraviolet (UV) side was 12.4 nm Further, a difference between a half-value wavelength on the ultraviolet side and a half-value wavelength on the near-infrared side of a transmission band under the 0° incident condition was 277 nm. A range of the transmission band was from 424 nm to 681 nm. Further, the half-value wavelength on the near-infrared side was 695 nm, and the half-value wavelength on the ultraviolet side was 418 nm. A width of a stop band on the near-infrared side was 90 nm, and a width of a stop band on the ultraviolet side was 1 nm.

(Consideration about Example 9)

As described above, it was found out that the optical multilayer presented in Table 9 satisfies the spectral characteristics explained while referring to FIG. 2.

Comparative Example 1

Next, a comparative example 1 will be described. In the comparative example 1, titanium oxide ($TiO_2$) was used as the material of the high-refractive index layer, and silicon oxide ($SiO_2$) was used as the material of the low-refractive index layer. Note that spectral characteristics were simulated by setting a refractive index of titanium oxide ($TiO_2$) at the wavelength of 500 nm to 2.47, and setting a refractive index of silicon oxide ($SiO_2$) at the wavelength of 500 nm to 1.48. Hereinafter, layer conditions and simulation results in the comparative example 1 are presented in the following Table 10 and FIG. 15, respectively. Note that a "layer thickness" in Table 10 indicates a physical layer thickness. Further, a "coefficient value" is a coefficient indicating that the physical layer thickness corresponds to a product as a result of multiplying the QWOT by what number.

TABLE 10

| Layer number | Layer material | Layer thickness d [nm] | Coefficient value |
| --- | --- | --- | --- |
| 1 | $TiO_2$ | 14.99 | 0.2962024 |
| 2 | $SiO_2$ | 49.44 | 0.5853696 |
| 3 | $TiO_2$ | 34.48 | 0.6813248 |
| 4 | $SiO_2$ | 49.16 | 0.5820544 |
| 5 | $TiO_2$ | 30.78 | 0.6082128 |
| 6 | $SiO_2$ | 58.92 | 0.6976128 |
| 7 | $TiO_2$ | 33.99 | 0.6716424 |
| 8 | $SiO_2$ | 52.13 | 0.6172192 |
| 9 | $TiO_2$ | 33.49 | 0.6617624 |
| 10 | $SiO_2$ | 59.63 | 0.7060192 |
| 11 | $TiO_2$ | 33.39 | 0.6597864 |

TABLE 10-continued

| Layer number | Layer material | Layer thickness d [nm] | Coefficient value |
| --- | --- | --- | --- |
| 12 | $SiO_2$ | 52.91 | 0.6264544 |
| 13 | $TiO_2$ | 34.59 | 0.6834984 |
| 14 | $SiO_2$ | 59.64 | 0.7061376 |
| 15 | $TiO_2$ | 32.48 | 0.6418048 |
| 16 | $SiO_2$ | 53.00 | 0.6275200 |
| 17 | $TiO_2$ | 35.62 | 0.7038512 |
| 18 | $SiO_2$ | 59.25 | 0.7015200 |
| 19 | $TiO_2$ | 30.35 | 0.5997160 |
| 20 | $SiO_2$ | 52.15 | 0.6174560 |
| 21 | $TiO_2$ | 37.37 | 0.7384312 |
| 22 | $SiO_2$ | 56.83 | 0.6728672 |
| 23 | $TiO_2$ | 22.88 | 0.4521088 |
| 24 | $SiO_2$ | 53.33 | 0.6314272 |
| 25 | $TiO_2$ | 107.57 | 2.1255832 |
| 26 | $SiO_2$ | 153.56 | 1.8181504 |
| 27 | $TiO_2$ | 87.58 | 1.7305808 |
| 28 | $SiO_2$ | 145.19 | 1.7190496 |
| 29 | $TiO_2$ | 84.51 | 1.6699176 |
| 30 | $SiO_2$ | 143.03 | 1.6934752 |
| 31 | $TiO_2$ | 83.26 | 1.6452176 |
| 32 | $SiO_2$ | 141.70 | 1.6777280 |
| 33 | $TiO_2$ | 82.51 | 1.6303976 |
| 34 | $SiO_2$ | 141.18 | 1.6715712 |
| 35 | $TiO_2$ | 82.18 | 1.6238768 |
| 36 | $SiO_2$ | 141.06 | 1.6701504 |
| 37 | $TiO_2$ | 82.12 | 1.6226912 |
| 38 | $SiO_2$ | 141.27 | 1.6726368 |
| 39 | $TiO_2$ | 82.04 | 1.6211040 |
| 40 | $SiO_2$ | 141.65 | 1.6771360 |
| 41 | $TiO_2$ | 82.36 | 1.6274336 |
| 42 | $SiO_2$ | 142.11 | 1.6825824 |
| 43 | $TiO_2$ | 82.85 | 1.6371160 |
| 44 | $SiO_2$ | 143.22 | 1.6957248 |
| 45 | $TiO_2$ | 83.96 | 1.6590496 |
| 46 | $SiO_2$ | 145.38 | 1.7212992 |
| 47 | $TiO_2$ | 86.00 | 1.6993600 |
| 48 | $SiO_2$ | 149.04 | 1.7646336 |
| 49 | $TiO_2$ | 90.49 | 1.7880824 |
| 50 | $SiO_2$ | 158.30 | 1.8742720 |
| 51 | $TiO_2$ | 94.99 | 1.8770024 |
| 52 | $SiO_2$ | 80.62 | 0.9545408 |

As presented in Table 10, the optical multilayer in the example has a structure in which the base units (H, L) are repeatedly stacked. 52 layers are stacked to form the layer.

Figure 15:
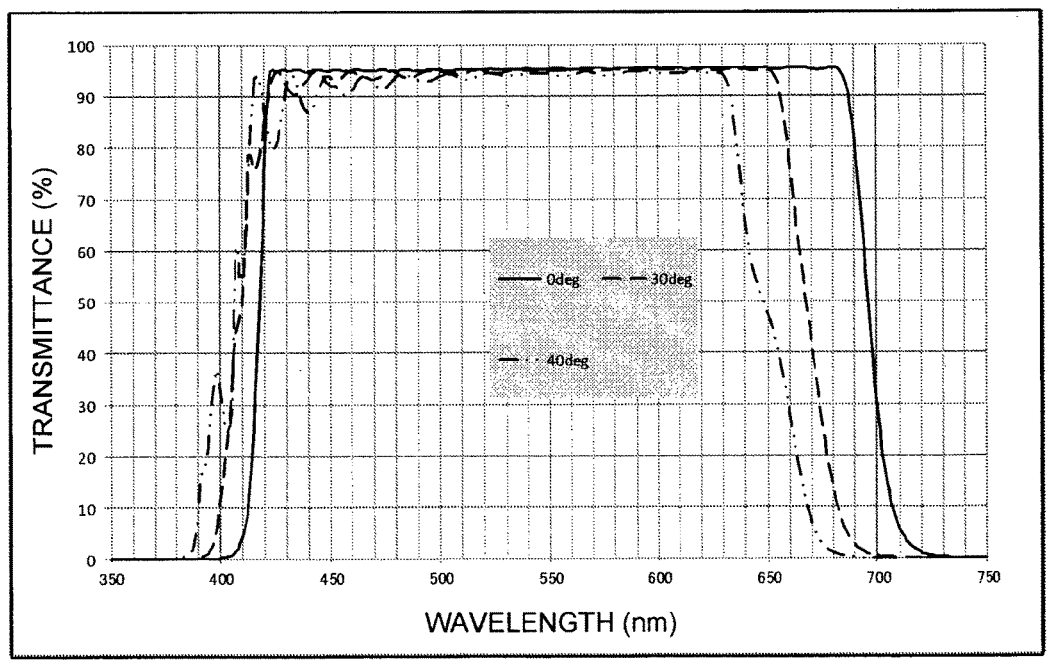
FIG. 15 illustrates simulation results of a near-infrared cut filter according to a comparative example 1.

FIG. 15 illustrates simulation results of spectral characteristics of the optical multilayer presented in Table 10. In FIG. 15, a vertical axis indicates a transmittance, and a horizontal axis indicates a wavelength. FIG. 15 illustrates simulation results under the 0° incident condition and the 30° incident condition. As a result of the simulation, in the layer configuration presented in Table 1, a shift amount at a half-wavelength position between the case of the 0° incident condition and the case of the 30° incident condition on the near-infrared (IR) side was 28.5 nm, and that on the ultraviolet (UV) side was 7.7 nm. Further, a range of the transmission band was from 424 nm to 681 nm. Further, a range of a stop band on the near-infrared side was from 711 nm to 943 nm.

From the simulation results in FIG. 15, it was found out that a shift amount at a half-value wavelength position of the transmission band of the optical multilayer presented in Table 10 between the case of the 0° incident condition and the case of the 30° incident condition on the ultraviolet (UV) side is 7.7 nm, and that on the near-infrared (IR) side is 28.5 nm. Further, a difference between a half-value wavelength on the ultraviolet side and a half-value wavelength on the near-infrared side of the transmission band was found out to be 278 nm. From the above results, it was found out that the optical multilayer presented in Table 10 does not satisfy the spectral characteristics explained while referring to FIG. 2.

(Comparison Between Examples 1 to 9 and Comparative Example 1)

From the simulation results of the examples and the comparative example 1, when only the shift amount at the half-value wavelength position on the ultraviolet (UV) side is observed, the comparative example has a smaller shift amount. However, this is because the shift at the portion with high transmittance is suppressed due to PS separation caused by an oblique-incidence dependence, a deformation of waveform due to the PS separation, the generation of ripple and the like. Specifically, this does not mean that the incident angle dependence becomes small in the comparative example.

For example, when the example 1 and the comparative example 1 are compared, in the vicinity of T20% (transmittance of 20%), the comparative example has an extremely large shift amount, and further, an ultraviolet (UV)-cutting waveform is extremely distorted. Further, in the comparative example, the ripple due to the oblique incidence is generated also in the transmission band, and such an influence due to the oblique incidence is greater than that in the example 1. From the above result, it can be easily infer that the comparative example may exert an adverse effect on an image quality and the like, which is greater than that of the example 1.

Specifically, when only the shift amount at the half-value wavelength position on the ultraviolet (UV) side is observed, it seems that the comparative example 1 is superior to the example 1, but, actually, in the comparative example 1, the ripple is generated, and particularly, an extremely large wavelength shift occurs in the region where the transmittance is 20% or less, so that the quality as a correction filter apparently deteriorates.

Note that in the above description, a transmission region of 390 nm or less in the example 1 is ignored since the wavelength shift is prevented by using the stop layer and the ultraviolet region absorption of layer itself.

As described above, it was found out that by setting that the configuration of the optical multilayer to employ the structure in which the base units ($a_n Q_H$, $b_n Q_L$, $c_n Q_H$, $d_n Q_L$) are repeatedly stacked, and to employ the configuration in which the following expression (5) and expression (6) are satisfied, it is possible to suppress the incident angle dependence (wavelength shift) of the near-infrared cut filter (IRCF).

$$1.5 \leq A \leq 2.5 \tag{5}$$

$$(B+C+D)/3 \leq 1.0 \tag{6}$$

Further, it was found out that by employing the configuration in which the average value C of the coefficients $c_n$ satisfies the following expression (7), the widths of the transmission band and the stop band on the infrared (IR) side can be sufficiently secured.

$$0.2 \leq C \leq 0.5 \tag{7}$$

Further, it was found out that by employing the configuration in which the coefficients $b_n$ and $d_n$ satisfy the following expression (8), the width of the stop band on the ultraviolet (UV) side as well can be sufficiently secured.

$$1.1 \leq \text{Average}(\max(b_n/d_n, d_n/b_n)) \leq 2.5 \tag{8}$$

Example 10

Figure 16:
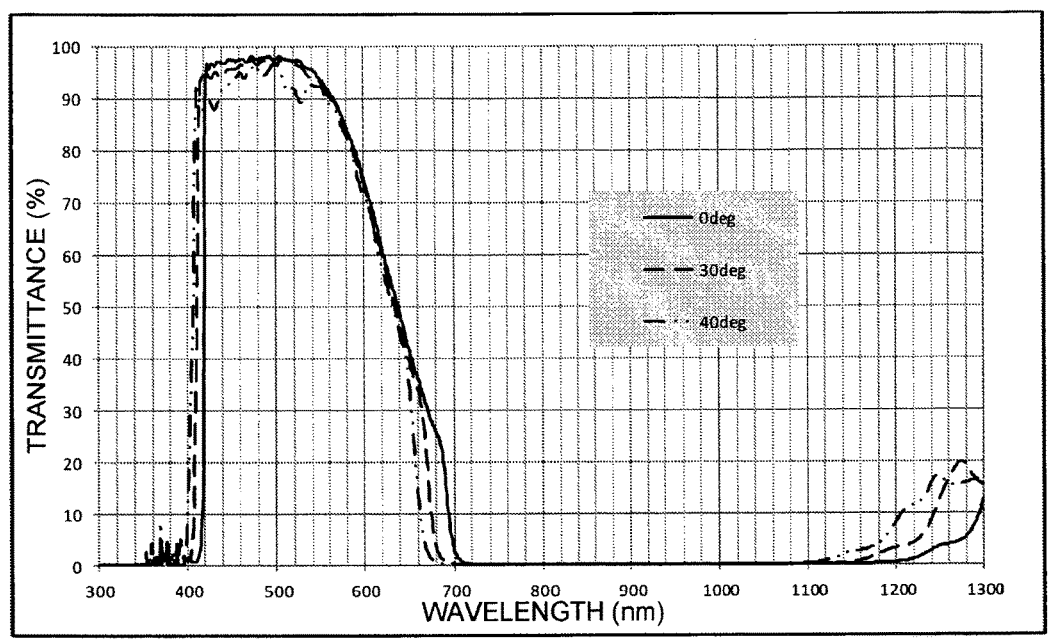
FIG. 16 illustrates simulation results of a near-infrared cut filter according to an example 10.
Figure 17:
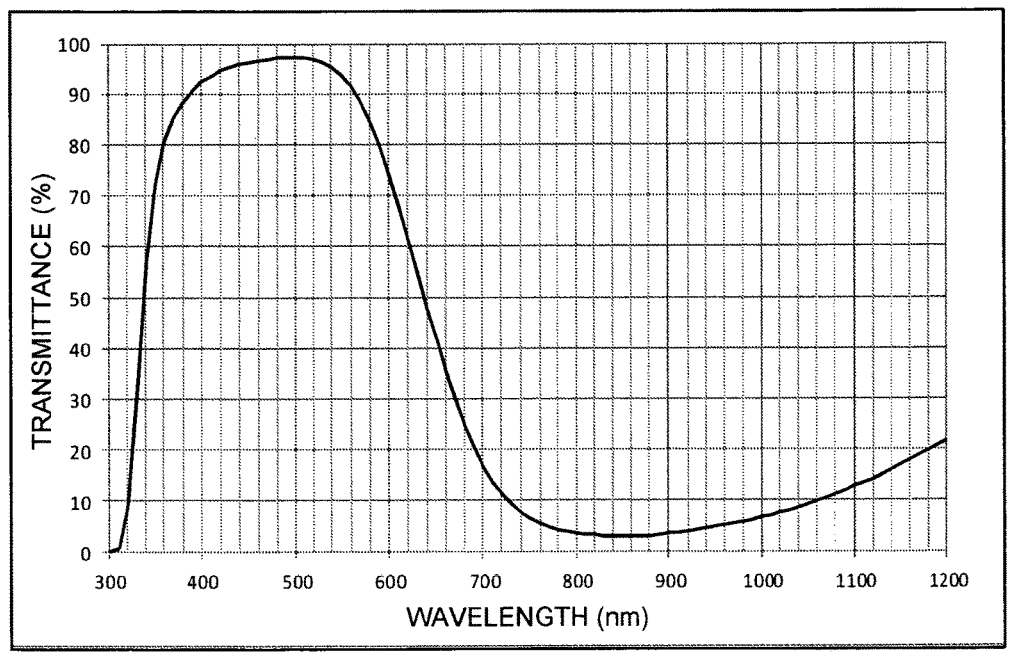
FIG. 17 illustrates simulation results of a transparent substrate according to the example 10.

Next, an example 10 will be described. In the example 10, a near-infrared cut filter glass (manufactured by AGC TECHNO GLASS CO., LTD., NF-50 series, plate thickness of 0.3 mm) was used as a transparent substrate, an optical multilayer same as that of the example 1 was formed on one surface of the glass, and a stop-band-expanding optical multilayer presented in Table 11 was formed on the other surface of the glass. Hereinafter, simulation results of spectral characteristics of the example 10 are presented in FIG. 16. Further, spectral characteristics of the aforementioned transparent substrate itself (manufactured by AGC TECHNO GLASS CO., LTD., NF-50 series, plate thickness of 0.3 mm, anti-reflection layers (AR layers) are provided on both surfaces of the substrate) are presented in FIG. 17. Further, a "layer thickness" in Table 11 indicates a physical layer thickness. Further, a "coefficient value" is a coefficient indicating that the physical layer thickness corresponds to a product as a result of multiplying the QWOT by what number.

TABLE 11

| Layer number | Layer material | Layer thickness [nm] |
| --- | --- | --- |
| 1 | $TiO_2$ | 7.97 |
| 2 | $MgF_2$ | 59.7 |
| 3 | $TiO_2$ | 11.4 |
| 4 | $SiO_2$ | 98.81 |
| 5 | $TiO_2$ | 18.27 |
| 6 | $SiO_2$ | 48.73 |
| 7 | $TiO_2$ | 39.87 |
| 8 | $SiO_2$ | 43.03 |
| 9 | $TiO_2$ | 23.21 |
| 10 | $SiO_2$ | 91.02 |
| 11 | $TiO_2$ | 16.88 |
| 12 | $SiO_2$ | 59.61 |
| 13 | $TiO_2$ | 20.9 |
| 14 | $SiO_2$ | 184.8 |
| 15 | $Ta_2O_5$ | 41.63 |
| 16 | $TiO_2$ | 29.75 |
| 17 | $Ta_2O_5$ | 41.85 |
| 18 | $SiO_2$ | 143.61 |
| 19 | $Ta_2O_5$ | 39.73 |
| 20 | $TiO_2$ | 27.72 |
| 21 | $Ta_2O_5$ | 39.54 |
| 22 | $SiO_2$ | 142.62 |
| 23 | $Ta_2O_5$ | 34.77 |
| 24 | $TiO_2$ | 20.15 |
| 25 | $Ta_2O_5$ | 50.51 |
| 26 | $SiO_2$ | 133.76 |
| 27 | $Ta_2O_5$ | 48.05 |
| 28 | $TiO_2$ | 29.73 |
| 29 | $Ta_2O_5$ | 27.78 |
| 30 | $SiO_2$ | 143.26 |
| 31 | $Ta_2O_5$ | 36.24 |
| 32 | $TiO_2$ | 30.74 |
| 33 | $Ta_2O_5$ | 36.86 |
| 34 | $SiO_2$ | 141.36 |
| 35 | $Ta_2O_5$ | 32.25 |
| 36 | $TiO_2$ | 36.41 |
| 37 | $Ta_2O_5$ | 37.13 |
| 38 | $SiO_2$ | 140.51 |
| 39 | $Ta_2O_5$ | 29.95 |
| 40 | $TiO_2$ | 35.98 |
| 41 | $Ta_2O_5$ | 44.09 |
| 42 | $SiO_2$ | 132.49 |
| 43 | $Ta_2O_5$ | 48.78 |
| 44 | $TiO_2$ | 43.41 |
| 45 | $Ta_2O_5$ | 14.37 |
| 46 | $SiO_2$ | 161.23 |
| 47 | $Ta_2O_5$ | 19.3 |
| 48 | $TiO_2$ | 39.56 |
| 49 | $Ta_2O_5$ | 51.77 |
| 50 | $SiO_2$ | 142.56 |
| 51 | $Ta_2O_5$ | 55.13 |
| 52 | $TiO_2$ | 28.42 |
| 53 | $Ta_2O_5$ | 34.09 |

TABLE 11-continued

| Layer number | Layer material | Layer thickness [nm] |
|---|---|---|
| 54 | $SiO_2$ | 174.18 |
| 55 | $Ta_2O_5$ | 14.45 |
| 56 | $TiO_2$ | 11.48 |
| 57 | $Ta_2O_5$ | 94.52 |
| 58 | $SiO_2$ | 187.48 |
| 59 | $Ta_2O_5$ | 56.77 |
| 60 | $TiO_2$ | 32.65 |
| 61 | $Ta_2O_5$ | 46.58 |
| 62 | $SiO_2$ | 170.8 |
| 63 | $Ta_2O_5$ | 23.54 |
| 64 | $TiO_2$ | 77.95 |
| 65 | $Ta_2O_5$ | 19.26 |
| 66 | $SiO_2$ | 168.52 |
| 67 | $Ta_2O_5$ | 35.99 |
| 68 | $TiO_2$ | 50.43 |
| 69 | $Ta_2O_5$ | 50.21 |
| 70 | $SiO_2$ | 193.46 |
| 71 | $Ta_2O_5$ | 67.01 |
| 72 | $TiO_2$ | 25.81 |
| 73 | $Ta_2O_5$ | 40.35 |
| 74 | $SiO_2$ | 174.51 |
| 75 | $Ta_2O_5$ | 16.09 |
| 76 | $TiO_2$ | 86.32 |
| 77 | $Ta_2O_5$ | 18.99 |
| 78 | $SiO_2$ | 177.1 |
| 79 | $Ta_2O_5$ | 51.46 |
| 80 | $TiO_2$ | 30.67 |
| 81 | $Ta_2O_5$ | 56.31 |
| 82 | $SiO_2$ | 184.52 |
| 83 | $Ta_2O_5$ | 40.39 |
| 84 | $TiO_2$ | 81.13 |
| 85 | $SiO_2$ | 88.13 |

Comparative Example 2

Figure 18:
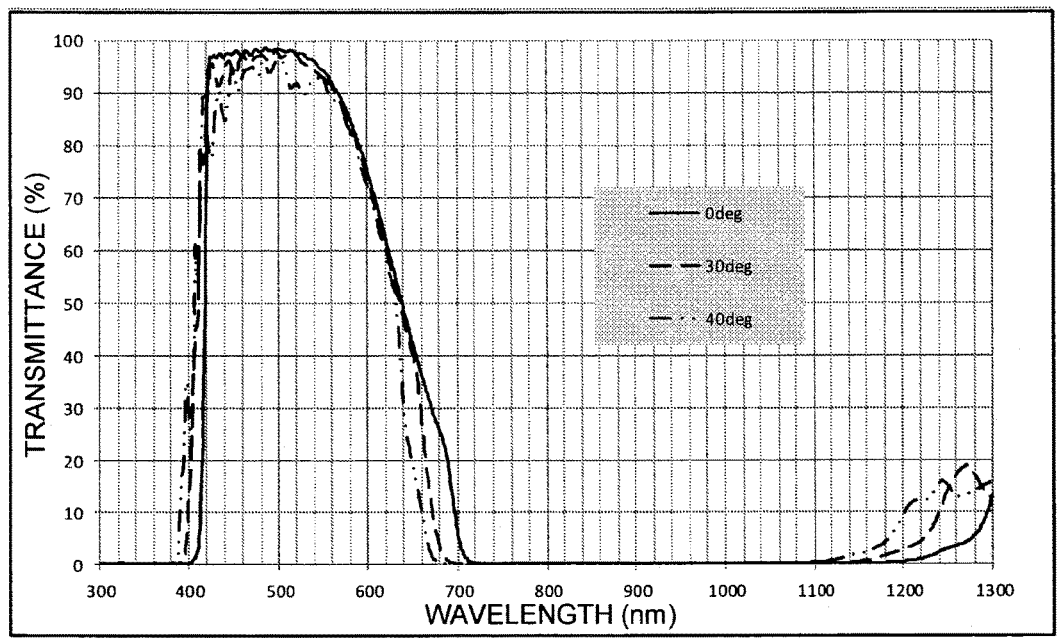
FIG. 18 illustrates simulation results of a near-infrared cut filter according to a comparative example 2.

Next, a comparative example 2 will be described. In the comparative example 2, a transparent substrate and a stop-band-expanding optical multilayer same as those of the example 10 were used to form an optical multilayer same as that of the comparative example 1. FIG. 18 illustrates simulation results of spectral characteristics of the comparative example 2.

(Comparison Between Example 10 and Comparative Example 2)

A large part of the spectral characteristics of the example 10 in the visible wavelength region corresponds to the spectral characteristics of the transparent substrate. It can be considered that this is because a width of the transmission band in the visible wavelength region of the optical multilayer used in the example 10 is wide. Further, the incident angle dependence of light is also suppressed, and also in a comparison between the case where the incident angle is 0° and the case where the incident angle is 40°, a change in the spectral characteristics on the near-infrared side is small. On the contrary, in the spectral characteristics of the comparative example 2, an amount of wavelength shift on the near-infrared side of the transmission band is large when comparing the case where the incident angle is 0° and the case where the incident angle is 40°, and a change in the transmittance in a part of the visible wavelength region becomes large.

This is caused due to a high incident angle dependence of the optical multilayer used in the comparative example 2. Note that when the wavelength shift is tried to be reduced by increasing the high-refractive index component under the general design of repeating structure of $(HL)^n$ as in the comparative example 2, the transmission band becomes narrow, and thus the layer cannot be used for the above-described purposes.

Example 11

Figure 19:
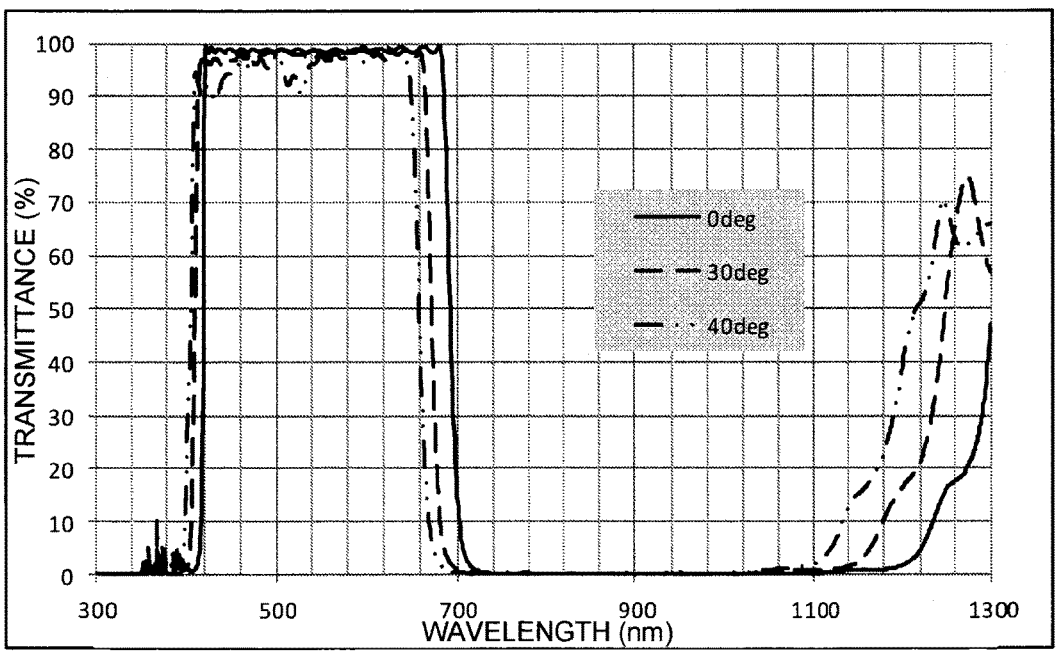
FIG. 19 illustrates simulation results of a near-infrared cut filter according to an example 11.
Figure 20:
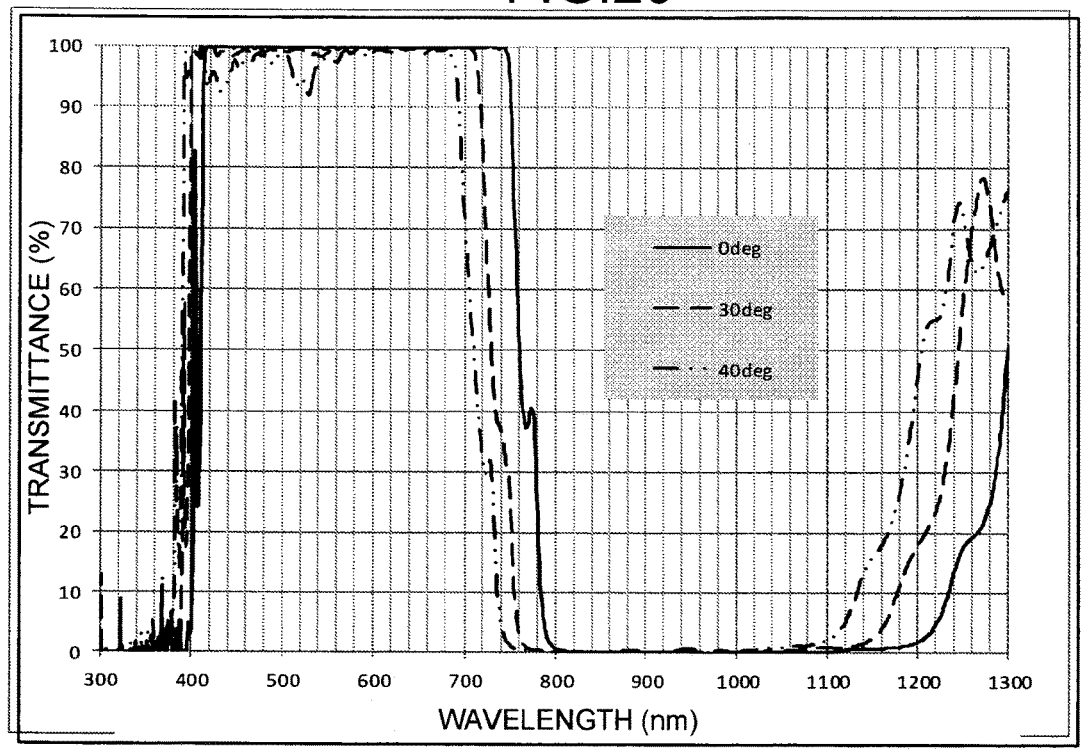
FIG. 20 illustrates simulation results of a transparent substrate according to the example 11.

Next, an example 11 will be described. In the example 11, a high transparency glass was used as a transparent substrate, an optical multilayer same as that of the example 1 was formed on one surface of the glass, and a stop-band-expanding optical multilayer presented in Table 11 was formed on the other surface of the glass. Hereinafter, simulation results of spectral characteristics of the example 11 are presented in FIG. 19. Further, spectral characteristics of the aforementioned transparent substrate having only the stop-band-expanding optical multilayer presented in Table 11 formed on the one surface thereof, are presented in FIG. 20.

Comparative Example 3

Figure 21:
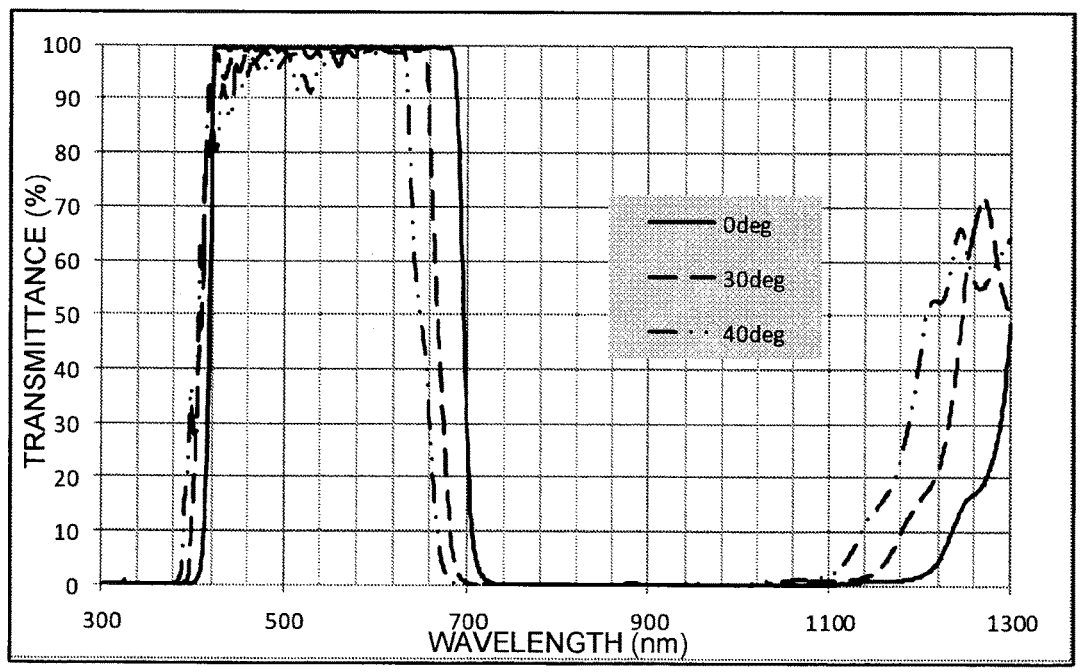
FIG. 21 illustrates simulation results of a near-infrared cut filter according to a comparative example 3.

Next, a comparative example 3 will be described. In the comparative example 3, a transparent substrate and a stop-band-expanding optical multilayer same as those of the example 11 were used to form an optical multilayer same as that of the comparative example 1. FIG. 21 illustrates simulation results of spectral characteristics of the comparative example 3.

(Comparison Between Example 11 and Comparative Example 3)

In the spectral characteristics of the example 11, the incident angle dependence of light is suppressed, and in a comparison between the case where the incident angle is 0° and the case where the incident angle is 40°, a change in the spectral characteristics on the near-infrared side is small. On the contrary, in the spectral characteristics of the comparative example 3, an amount of wavelength shift on the near-infrared side of the transmission band is large when comparing the case where the incident angle is 0° and the case where the incident angle is 40°, and a change in the transmittance in a part of the visible wavelength region becomes large.

This is caused due to a high incident angle dependence of the optical multilayer used in the comparative example 3. Note that when the wavelength shift is tried to be reduced by increasing the high-refractive index component under the general design of repeating structure of $(HL)^n$ as in the comparative example 3, the transmission band becomes narrow, and thus the layer cannot be used for the above-described purposes.

A near-infrared cut filter of the present invention can suppress an incident angle dependence (wavelength shift). Further, it is possible to sufficiently secure widths of a transmission band and a stop band on an infrared (IR) side. Further, it is possible to sufficiently secure a width of a stop band on an ultraviolet (UV) side as well. Therefore, the near-infrared cut filter can be suitably used for spectral correction of a solid-state imaging device (for example, a CCD image sensor, a CMOS image sensor and the like) of a digital camera, a digital video and the like.

What is claimed is:
1. A near-infrared cut filter, comprising:
a transparent substrate; and
an optical multilayer provided on at least one main surface of the transparent substrate, wherein:
the optical multilayer is formed of a high-refractive index layer having a refractive index of 2.0 or more, and a low-refractive index layer having a refractive index of 1.6 or less at a wavelength of 500 nm; and the optical multilayer has a repeating structure of $(a_n Q_H, b_n Q_L, c_n Q_H, d_n Q_L)\hat{\ }n$ when a Quarter Wave Optical Thickness (QWOT) at the wavelength of 500 nm of the high-refractive index layer is set to $Q_H$, and a QWOT at the wavelength of 500 nm of the low-refractive index layer is set to $Q_L$, in which an average value of the $a_n$ is not less than 1.5 nor more than 2.5, and a value obtained by averaaing average values of the respective $b_n$, $c_n$, and $d_n$ is 1.0 or less, wherein n represents a number of base units $(a_n Q_H, b_n Q_L, c_n Q_H, d_n Q_L)$ that are stacked to form the optical multilayer, and wherein each of $a_n$, $b_n$, $c_n$, and $d_n$ is a coefficient in each base unit, and represents that a physical layer thickness of a layer in each base unit corresponds to a product as a result of multiplying the QWOT by that coefficient.

2. The near-infrared cut filter according to claim 1, wherein the average value of the $c_n$ is not less than 0.2 nor more than 0.5.

3. The near-infrared cut filter according to claim 1, wherein ratios $b_n/d_n$, and $d_n/b_n$ are calculated in each of the repeatedly stacked base units, and for each number of base units n, the larger of the ratios $b_n/d_n$ and $d_n/b_n$ is used to calculate an average for all of the repeatedly stacked based units, and the value obtained by averaging such larger values of the calculated $b_n/d_n$ and $d_n/b_n$ for each number of base units is not less than 1.1 nor more than 2.5.

4. The near-infrared cut filter according to claim 1, wherein the n is not less than 9 nor more than 25.

5. The near-infrared cut filter according to claim 1, wherein the transparent substrate has absorption of light in a near-infrared wavelength region.

6. The near-infrared cut filter according to claim 1, wherein the average value of the $c_n$ is not less than 0.2 nor more than 0.4.

* * * * *